US009507850B1

(12) United States Patent
Hepp

(10) Patent No.: US 9,507,850 B1
(45) Date of Patent: Nov. 29, 2016

(54) METHOD AND SYSTEM FOR SEARCHING DATABASES

(75) Inventor: Daniel J. Hepp, Novi, MI (US)

(73) Assignee: Proquest, LLC, Ann Arbor, MI (US)

( * ) Notice: Subject to any disclaimer, the term of this patent is extended or adjusted under 35 U.S.C. 154(b) by 255 days.

(21) Appl. No.: 11/215,390

(22) Filed: Aug. 30, 2005

(51) Int. Cl.
G06F 7/00 (2006.01)
G06F 17/30 (2006.01)

(52) U.S. Cl.
CPC ..... *G06F 17/3064* (2013.01); *G06F 17/30058* (2013.01); *G06F 17/30864* (2013.01)

(58) Field of Classification Search
CPC ....................................................... G06F 17/30
See application file for complete search history.

(56) References Cited

U.S. PATENT DOCUMENTS

| | | | | |
|---|---|---|---|---|
| 6,169,986 B1 * | 1/2001 | Bowman et al. | | 707/5 |
| 6,574,622 B1 * | 6/2003 | Miyauchi et al. | | 707/4 |
| 6,636,853 B1 * | 10/2003 | Stephens, Jr. | | 707/10 |
| 6,751,611 B2 * | 6/2004 | Krupin et al. | | 707/3 |
| 6,999,959 B1 * | 2/2006 | Lawrence et al. | | 707/5 |
| 2002/0049781 A1 * | 4/2002 | Bengtson | | 707/500.1 |
| 2003/0097357 A1 * | 5/2003 | Ferrari et al. | | G06F 17/30864 |
| 2004/0267723 A1 * | 12/2004 | Bharat | | 707/3 |
| 2005/0033657 A1 * | 2/2005 | Herrington et al. | | 705/26 |
| 2005/0050024 A1 * | 3/2005 | Ellis et al. | | 707/3 |
| 2006/0212423 A1 * | 9/2006 | Jones et al. | | 707/2 |
| 2006/0242013 A1 * | 10/2006 | Agarwal et al. | | 705/14 |
| 2007/0022096 A1 * | 1/2007 | Hertz | | 707/3 |

* cited by examiner

*Primary Examiner* — Thu Nga Nguyen
(74) *Attorney, Agent, or Firm* — Patula & Associates, P.C.

(57) ABSTRACT

A method and system for searching databases uses query catching and/or metadata exploration features to analyze the search terms entered and present suggestions displayed on the initial search results page, together with the traditional search results. The method and system simplifies and improves the user's experience by mapping user queries to relevant methods for accessing content based on string similarity measures, term relationships, and editorial assertions. The method and system uses an underlying search engine that enhances search results and suggests topics, dates, and/or publications, displayed as links on the results page, to help focus the search using automatic indexing.

8 Claims, 23 Drawing Sheets

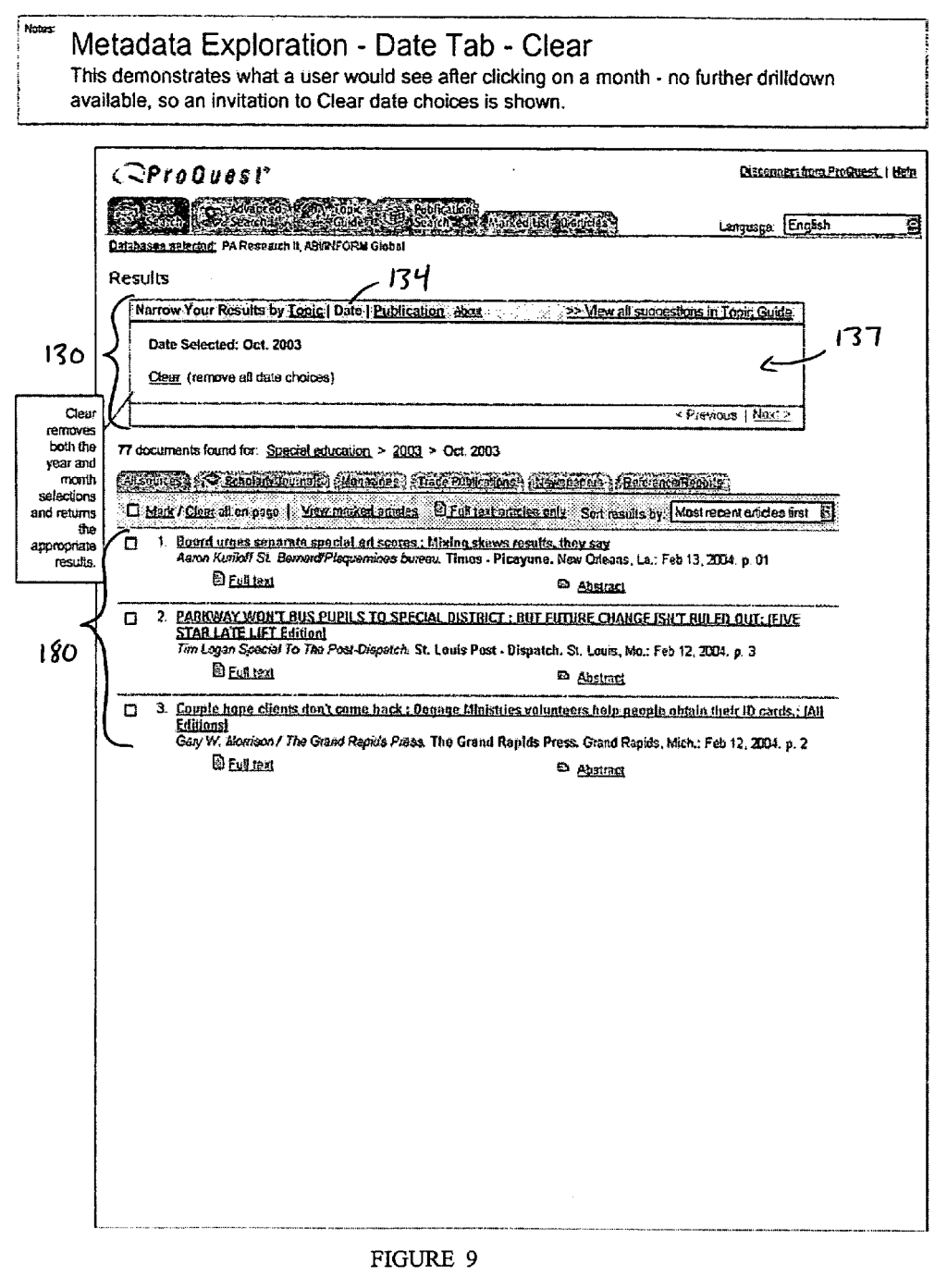

Metadata Exploration - Date Tab - Clear
This demonstrates what a user would see after clicking on a month - no further drilldown available, so an invitation to Clear date choices is shown.

FIGURE 9

Topic Guide - Metadata Exploration - Publications

ProQuest
University College Library | Virtual Reference | Click here to access ProQuestAlpha | Help Basic Search | Advanced Search | Browse | Publication Search | Marked List (0 articles)

Interface language: English

Databases selected: Multiple databases...

Browse

Topic Guide | Pubs Directory | Thesaurus | Reference Reports

Topic Guide

[ special education ] (Find Term)

● Suggest topics (enter keywords) About
○ Lookup topics A-Z (enter subject, company, location, person) About Selections: Special education View documents — 265 / 254 / 256

[Box: Dates and Pubs - future direction/ desirable - see Smart Search.]

260 { ... 252

250a { All Topics | Subjects | Companies/Orgs. | People | Locations | Dates | Publications
Jump to: [ ] (Go)    Sort by: [Number of documents ▼]

< Previous | Next >

230d {
The Times Educational Supplement; London
View documents ← 240d
Select this publication ← 245d Boston Globe; Boston, Mass.
View documents
Select this publication Chicago Tribune; Chicago, Ill.
View documents
Select this publication The Washington Post; Washington, D.C.
View documents
Select this publication Exceptional Children; Reston
View documents
Select this publication Education Week; Washington
View documents
Select this publication Times - Picayune; New Orleans, La. St.
View documents
Select this publication Louis Post - Dispatch; St. Louis, Mo.
View documents
Select this publication publication

[Box: Sort dropdown values:
Number of documents
Alphabetical order (A-Z)

Note -
- sticky
- default for links from query catching is number of docs]

FIGURE 17

METHOD AND SYSTEM FOR SEARCHING DATABASES

The present disclosure relates generally to methods and systems for searching databases, and in particular, databases related in general to publications and the like. Specifically, the present disclosure relates to a method and system using an underlying search engine which helps to guide a user through the process of narrowing the search using indexing processes, while at the same time enhancing the search results.

BACKGROUND OF THE INVENTION

People such as researchers and students, as well as others, have long had the need to search through vast quantities of various publications and other collections of information. For many years, such a process was done manually. With the advent of the computer, people were able to conduct searches of databases stored in a computer. Further, with the advent of the internet, people were able to perform such searches from a remote location via a personal computer.

However, searching of databases is a skill with which many people have difficulty. Selection of search terms is extremely important in arriving at the desired search results. All too often, searchers fail in selecting appropriate search terms for the desired or intended results, and the search results end up being far off topic or full of irrelevant search results.

Further, different databases use different programs and/or controlled vocabularies for searching the databases, which leads to a lack of uniformity in conducting searches. While a certain search technique may be appropriate for one database, the same technique may be inappropriate for another database. This is especially true where search terms can include the use of numerous different search commands. Thus, searchers often struggle with conducting a meaningful search of a particular database.

Various methods and systems have been used for searching databases in an attempt to assist the searcher and provide improved search results. The following is a discussion of several of these known methods and systems.

U.S. Pat. No. 6,772,150 discloses a search query refinement system that uses information about historical query submissions to suggest previously submitted, related search phrases to users. The related search phrases can be scored and selected for display based in part on an evaluation of the usefulness of each search phrase.

U.S. Pat. No. 6,732,088 discloses a method and system for collaborative searching by query induction wherein a node-link graph is constructed. Each node represents a query, and the nodes are linked based upon relatedness of the search results. Users can the follow these links to related documents that were not returned as a result of their query.

U.S. Pat. No. 6,704,727 discloses a method and system for generating a set of search terms. In response to a user's input, a first set of search terms are generated based upon matches or predefined associations between the input and the search terms. A second set of search terms is selected from the first set of search terms in response to a value score, which is related to the amount of revenue that each search term generates.

U.S. Pat. No. 6,671,681 discloses a system and method for suggesting alternative query expressions based on prior user selections and their query strings. A query manager monitors and records user choices and selections. Query strings are then standardized. Each search result item is associated with a list of alternative standardized queries by an alternative query matching manager, and displayed to a user by a page presentation manager.

U.S. Pat. No. 6,574,622 discloses a method and system for document retrieval wherein a user's query is expanded based upon estimated relational representations, and a group of query candidate representations are made and presented to the user. The user then selects the desired query candidate representation and a search is performed.

U.S. Pat. No. 6,549,941 discloses a method and system for resubmitting form data to related web sites, wherein after a user submits a query to a search engine of one web site, the user has the option to submit the same query to the search engines of one or more related web sites without the need to re-enter data.

U.S. Pat. No. 6,523,028 discloses a method and system for universal querying of distributed databases, wherein a user's query is generalized to expand the query. The user then selects terms from the expanded query, and a pictorial query is generated by searching a directory for database tables and/or attributes matching the selected terms. Finally, an SQL query is generated to retrieve relevant data from the actual distributed databases.

U.S. Pat. No. 6,453,312 discloses a system and method for developing a selectably-expandable concept-based search, wherein query development is performed using a hierarchical concept tree. The nodes of the concept tree are concepts that describe various search topics. The query is developed by traversing the hierarchical tree structure to selectively add character strings, related to a concept node, to a potential query.

U.S. Pat. No. 6,169,986 discloses a system and method for refining search queries, wherein query term correlation data is used to generate related terms which are suggested to a user, allowing the user to refine a search. Each related term is presented to the user via a respective hyperlink which can be selected by the user to submit a modified query.

U.S. Pat. No. 6,014,665 discloses a method for organizing information in which the search activity of users is monitored and such activity is used to suggest additional key terms for addition to a search query. Scores are assigned to key term grouping in an index, and used in subsequent searches to suggest other key terms which can be added to the search query to narrow the search.

U.S. Patent Application No. 2004/0249808 discloses a method and system for query expansion using query logs. A query related to an input query is selected from a query log. The selected query from the query log is submitted to a query processing system in place of the input query.

U.S. Patent Application No. 2004/0078214 discloses a method and system of providing product listing recommendations to users of a network-based commerce system having a plurality of listings arranged in a plurality of divisions. Based on user interaction with the system, a division and a frequently used search term are identified, and a link is provided to the user to listings associated with the frequently used search term.

U.S. Patent Application No. 2003/0225756 discloses a system and method for internet search using controlled vocabulary data, wherein a search query is formed by combining terms selected from a controlled vocabulary display program, and related terms retrieved by a filter means selected by a user.

U.S. Patent Application No. 2003/0088547 discloses a method and system for providing comprehensive search results wherein key terms of the query are identified and expanded to include additional terms relating to the key terms.

U.S. Patent Application No. 2003/0037050 discloses a system and method for predicting additional search results for a user based on the initial search query. Terms in an anticipated search term database, and documents in a document database, are assign a topical category, which is referenced to related categories. The initial search term is located in the anticipated search term database to determine the topical category. Documents which have been assigned to that topical category, as well as any related topical categories are retrieved.

U.S. Patent Application No. 2002/0059220 discloses an intelligent computerized search engine which identifies descriptions from a subject database that are conceptually similar to the target input string, using semantic relationships and contextual significance. The input phrase is supplemented with semantically related terms that express the meaning of the request more fully in the context of the database.

U.S. Patent Application No. 2002/0049781 discloses a method and system for serving a web page to a client device based on printed publications and publisher controlled links. The system generates a search index and a hyperlink database associated with a plurality of printed publications from different publishers. The system is then able to direct client devices to specific web pages in response to search queries, by correlating the received queries to network addresses using the search index and the hyperlink database.

While some of these known methods and systems have had some success in achieving the specific functions enumerated therein, they fall short in many respects in providing the users with enhanced search results, and helping the users to focus or narrow the search, especially with respect to searching databases related generally to publications and other collections of information.

Accordingly, there is a need in the database searching industry for an improved searching method and system, which is fast and easy to use, and which provides enhanced search results while helping to narrow or focus the search, yet remains flexible and selective. The present disclosure fulfills such a need, and provides numerous other benefits and advantages with respect to methods and systems from searching databases.

BRIEF SUMMARY OF THE INVENTION

The present disclosure relates to a method and system for searching databases, and in particular databases related to publications. The method and system may be used, for example, by students, faculty, researchers and library patrons, at schools, colleges and public libraries, for searching databases of publications such as books, newspapers, periodicals, reference materials, professional and trade journals, technical papers, dissertations, corporate brochures, industry newsletters, etc.

The method and system is an underlying search "engine" that enhances search results and suggests topics, dates, and/or publications, displayed as links on the results page, to help focus the search. The search "engine" helps to guide a user through the process of narrowing a search using indexing processes. Benefits of the method and system allow the user to seamlessly access powerful indexing; to quickly focus the search to the most relevant articles, and to tap into publications that focus on the search terms.

The method and system analyzes the search request, and provides an index of suggested related topics, dates and/or publications within the traditional search results page. The method and system also simplifies and improves the user's experience by mapping user queries to relevant methods for accessing content (such as index term searches, publication searches, etc.), based on string similarity measures, term relationships, and editorial assertions.

The method and system supports the following features:
Query Catching—the ability to map users' queries to a set of potentially relevant index terms, index term pairs, and publications.
Metadata Exploration—the ability to provide summaries of metadata across a set of documents, either for a set of database subsets overall, or for a restricted portion of a set of database subsets, built by limiting the document set to those containing given index terms, publications, and publication dates.

The method and system will use at least one of these two features to analyze the search terms entered and present suggestions displayed on the initial search results page, together with the traditional search results. When search terms are analyzed with the Query Catching feature, the method and system present the user with two types of suggestions: 1) suggested topic searches, and 2) browse suggested publications. When search terms are analyzed with the Metadata Exploration feature, the method and system present the user with three types of "Narrow Your Results" suggestions: 1) by topic, 2) by date, and 3) by publication.

Accordingly, it is the principal object of the present disclosure to provide a method and system for searching a database, and in particular a database relating generally to publications and/or other collections of information.

It is a further object of the present disclosure to provide a method and system for searching a database which enhances the search results and helps to focus the search.

It is also an object of the present disclosure to provide a method and system for searching a database which analyzes the search request and provides an index of suggested related topics, dates and publications within the traditional search results page.

It is another object of the present disclosure to provide a method and system for searching a database which simplifies and improves a user's experience by mapping user queries to relevant methods for accessing content based on string similarity measures, term relationships, and editorial assertions.

It is an additional object of the present disclosure to provide a method and system for searching a database using a query catching feature and/or a metadata exploration feature to analyze the search terms and present suggestions displayed on the initial search results page together with the traditional search results.

Numerous other advantages and features of the disclosure will become readily apparent from the following detailed description, from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein:

FIG. 3 is an exemplary web page of a search results page (bottom page) illustrating the query catching feature of the preferred embodiment of the present disclosure.

FIG. 4 is an exemplary web page of a search results page (null results page) illustrating the query catching feature of the preferred embodiment of the present disclosure.

FIG. 5 is an exemplary web page of a search results page enhanced through the selection of a query-catch term, and illustrating the topic tab metadata exploration feature of the preferred embodiment of the present disclosure.

FIG. 6 is an exemplary web page of a search results page (clear topics page) presented after a user has exhausted all possible topic choices of the topic tab metadata exploration feature of the preferred embodiment of the present disclosure.

FIG. 7 is an exemplary web page of a search results page enhanced through the selection of a query-catch term, and illustrating the dates (years) tab metadata exploration feature of the preferred embodiment of the present disclosure.

FIG. 8 is an exemplary web page of a search results page enhanced through the selection of a query-catch term and a year, and illustrating the dates (months) tab metadata exploration feature of the preferred embodiment of the present disclosure.

FIG. 9 is an exemplary web page of a search results page (clear dates page) presented after a user has exhausted all possible narrowing date choices of the date tab metadata exploration feature of the preferred embodiment of the present disclosure.

FIG. 17 is an exemplary web page of a suggested topic results page enhanced through the selection of a topic, and illustrating the publications metadata exploration feature of the topic guide navigation feature of the preferred embodiment of the present disclosure.

DETAILED DESCRIPTION OF THE DISCLOSED EMBODIMENT

Figure 1:
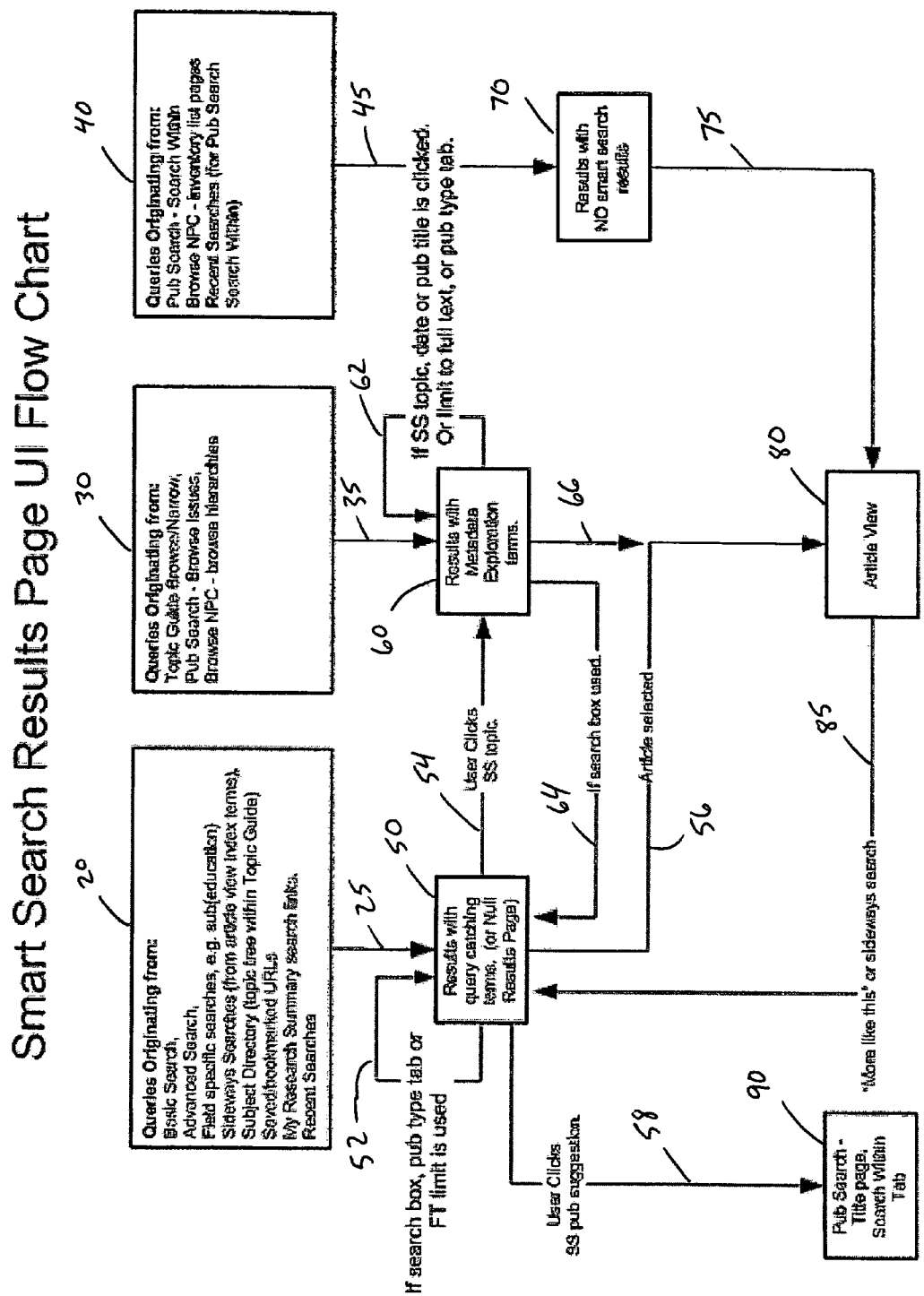
FIG. 1 is a flow chart of a preferred embodiment of the present disclosure.

While the invention is susceptible of embodiment in many different forms, there is shown in the drawings and will be described herein in detail one or more embodiments of the present disclosure. It should be understood, however, that the present disclosure is to be considered an exemplification of the principles of the invention, and the embodiment(s) illustrated is/are not intended to limit the spirit and scope of the invention and/or the claims herein.

FIG. 1 illustrates a flow chart of a preferred embodiment of the present disclosure, providing a general overview of the method and system for searching databases disclosed herein. FIG. 1 shows the high level paths that users may take through the user interface to reach Query Catching suggestions on the results page (Suggested Topic Searches and Suggested Publications) and Metadata Exploration suggestions (Topics, Dates and Publications) on the results page.

Query Blocks 20, 30 and 40 represent various navigation features from which a query can originate. Block 20 includes queries originating from the following features: Basic Search, Advanced Search, Field specific searches, e.g., sub (education), Sideways Searches (from article view index terms), Subject Directory (topic tree within Topic Guide), Saved/bookmarked URLs, My Research Summary search links, and Recent Searches. Block 30 includes queries origination from the following features: Topic Guide Browse/Narrow, Pub Search—Browse Issues, and Browse NPC—browse hierarchies. Block 40 includes queries originating from the following features: Pub Search—Search Within, Browse NPC—inventory list pages, and Recent Searches (for Pub Search—Search Within).

Depending upon the origin of the search, the search will lead the user to a specific search results block 50, 60 or 70. If a search originates from block 20, the user will go to search result block 50 via path 25. At block 50, the user is provided with search results including query catching terms (or null results page). If a search originates from block 30, the user will go to search result block 60 via path 35. At block 60, the user is provided with search results including metadata exploration terms. If a search originates from block 40, the user will go to search result block 70 via path 45. At block 70, the user is provided with search results which do not include either query catching terms or metadata exploration terms.

From search results block 50, the user's search can take several paths. If the search box, pub type tab or FT limit feature is used from the search results page, the search will follow path 52 and return to search result box 50 wherein additional search results with query catching terms will be displayed. If the user selects the SS topic feature, the user will follow path 54 to search result block 60, wherein search results with metadata exploration terms will be displayed. If the user selects an article, the user will follow path 56 to the view article block 80. If the user selects the SS pub suggestion feature, the user will follow path 58 to block 90, wherein the Pub Search—Title page, Search Within Tab feature is displayed.

From search results block 60, the user's search can take several paths. If an SS topic, date or pub title is selected, or if the limit to full text, or pub type tab is selected from the search results page, the search will follow path 62 and return to search result box 60 wherein additional search results with metadata exploration terms will be displayed. If the search box is used, the user will follow path 64 to search result block 50, wherein search results with query catching terms will be displayed. If the user selects an article, the user will follow path 66 to the view article block 80.

From search results block 70, the user can only select an article, whereupon the user will follow path 75 to the view article block 80. From the view article block 80, a user may select the "more like this" or sideways search feature, whereupon the user will follow path 85 to search result block 50, displaying additional results with query catching terms.

FIGS. 2-22 illustrate various search and/or search results pages which a user may encounter as the user navigates through the disclosed method and system for searching databases. While FIGS. 2-22 are illustrated with respect to a search of a publications database, it should be understood that the disclosed method and system is applicable to any database or collection of information. Additionally, the content of the web pages illustrated in FIGS. 2-22 can be displayed in any suitable location or layout on the page, and the method and system of the present disclosure is not intended to be limited specifically to the layout(s) illustrated.

FIGS. 2-12 illustrate the disclosed method and system with respect to a basic search. As will be described in more detail below with respect to FIGS. 2-12, a basic search is conducted by entering a query, comprising one or more search terms. The search results are provided on a search results page, along with the query catching and metadata exploration features of the disclosed method and system.

Figure 2:
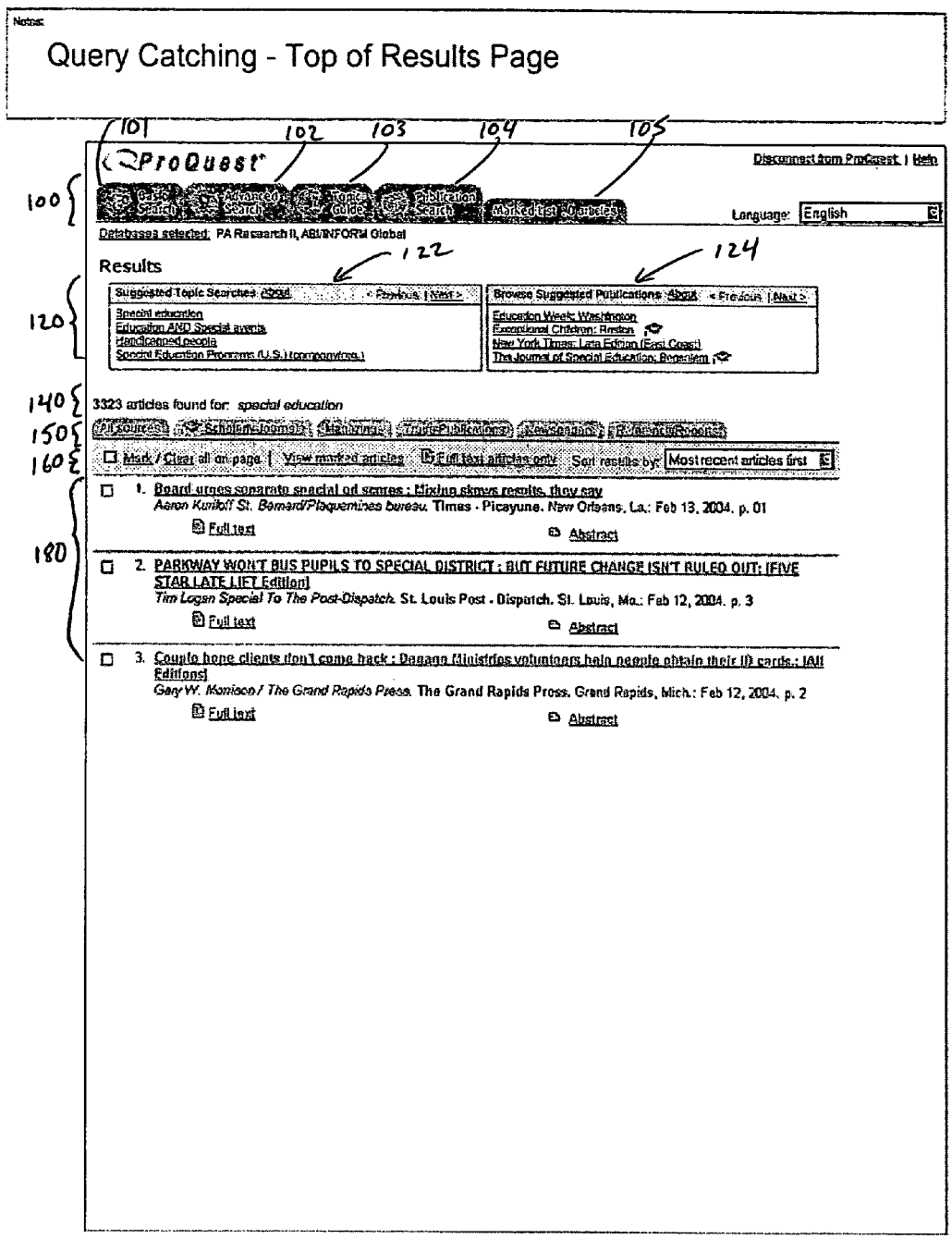
FIG. 2 is an exemplary web page of a search results page (top page) illustrating the query catching feature of the preferred embodiment of the present disclosure.
Figure 3:
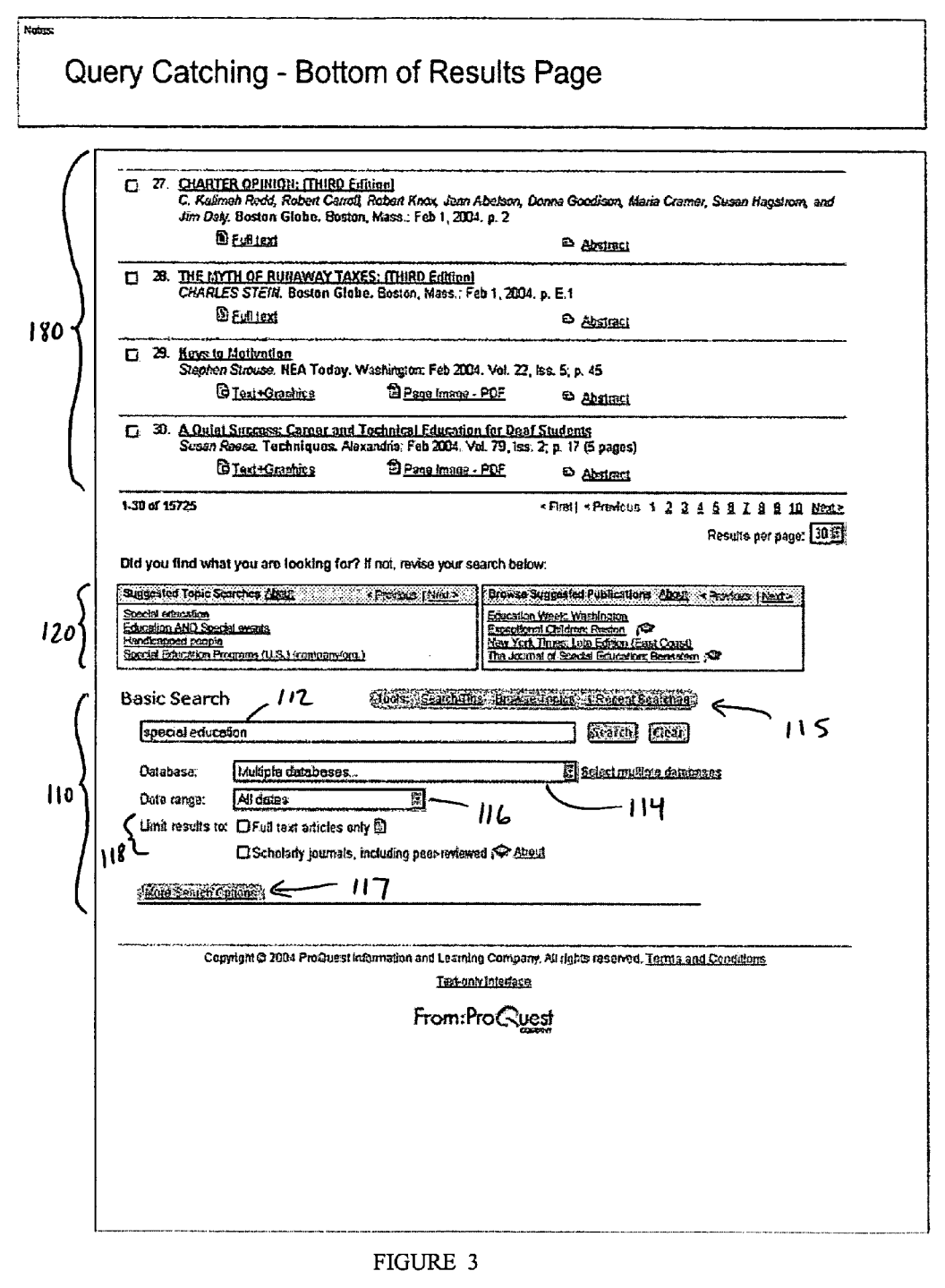

FIGS. 2 and 3 collectively illustrate an exemplary search results page, illustrating the query catching feature of the preferred embodiment of the present disclosure. FIG. 2 illustrates the top portion of the search results page. FIG. 3 illustrates the bottom portion of the search results page. It should be understood that FIGS. 2 and 3 would appear as a single page in a user's browser, wherein a select number of the search results are listed on each page of one or more search results pages, thirty results at a time in this example, and wherein a user would use a scroll bar or the like to view the page from top to bottom. At the bottom of the search results, a page navigation tool is presented to allow the user to select other pages of the search results, as well as the number of results per page.

A top section of the web page in FIG. 2 shows a plurality of general navigation tabs 100, including Basic Search tab 101, Advanced Search tab 102, Topic Guide tab 103, Publication Search tab 104, and Marked List tab 105. For illustration purposes only, FIGS. 2-12 are illustrated with respect to a user's search using the Basic Search tab 101.

When the Basic Search tab 101 is selected, or upon default thereto, a search field is displayed to the user, such as the search field 110 shown in FIG. 3. Search field 110 in this example includes a query term entry line 112, a database selection line 114, a date range line 116, a "limit results to" option list 118, a search tool bar 115 and a "more search options" button 117. It should be understood that selection of the Advanced Search tab 103 would provide a varying search field for entry of an advanced search.

Upon entering a query, in this example the terms "special education," and then selecting the search button at the end of the query entry line 112, the results page of FIGS. 2 and 3 is displayed. As will be described in more detail below, the traditional search results are displayed in section 180, in conjunction with the enhanced search results from the disclosed method and system. As can be seen, at the top of the Traditional Search Results section 180, a Search Results Summary Line 140 is provided, followed by a plurality of Search Result Navigation tabs 150 and a Results Management section 160.

Referring again to FIG. 2, below the navigation tabs 100, the results of the query catching feature of the disclosed method and system are displayed in query catching section 120. This section 120 presents the user with a Suggested Topic Searches window 122 and a Browse Suggested Publications window 124. The Suggested Topic Searches window 122 presents a list of topics generated by the query catching feature of the disclosed method and system in response to the user's query. Each suggested topic is presented as a hyperlink. Similarly, the Browse Suggested Publications window 124 presents a list of publications generated by the query catching feature of the disclosed method and system in response to the user's query. Each suggested publication is presented as a hyperlink.

Preferably, query catching section 120 is presented both before and after Traditional Search Results section 180, as illustrated in FIGS. 2 and 3. It should be understood however, that query catching section 120 could be present only once at the top, or at the bottom of the results page, or elsewhere on the page. Additionally, Basic Search field 110 is preferably provided on the results page, at the bottom as illustrated in FIG. 3, or elsewhere, to allow the search to be modified.

Figure 4:
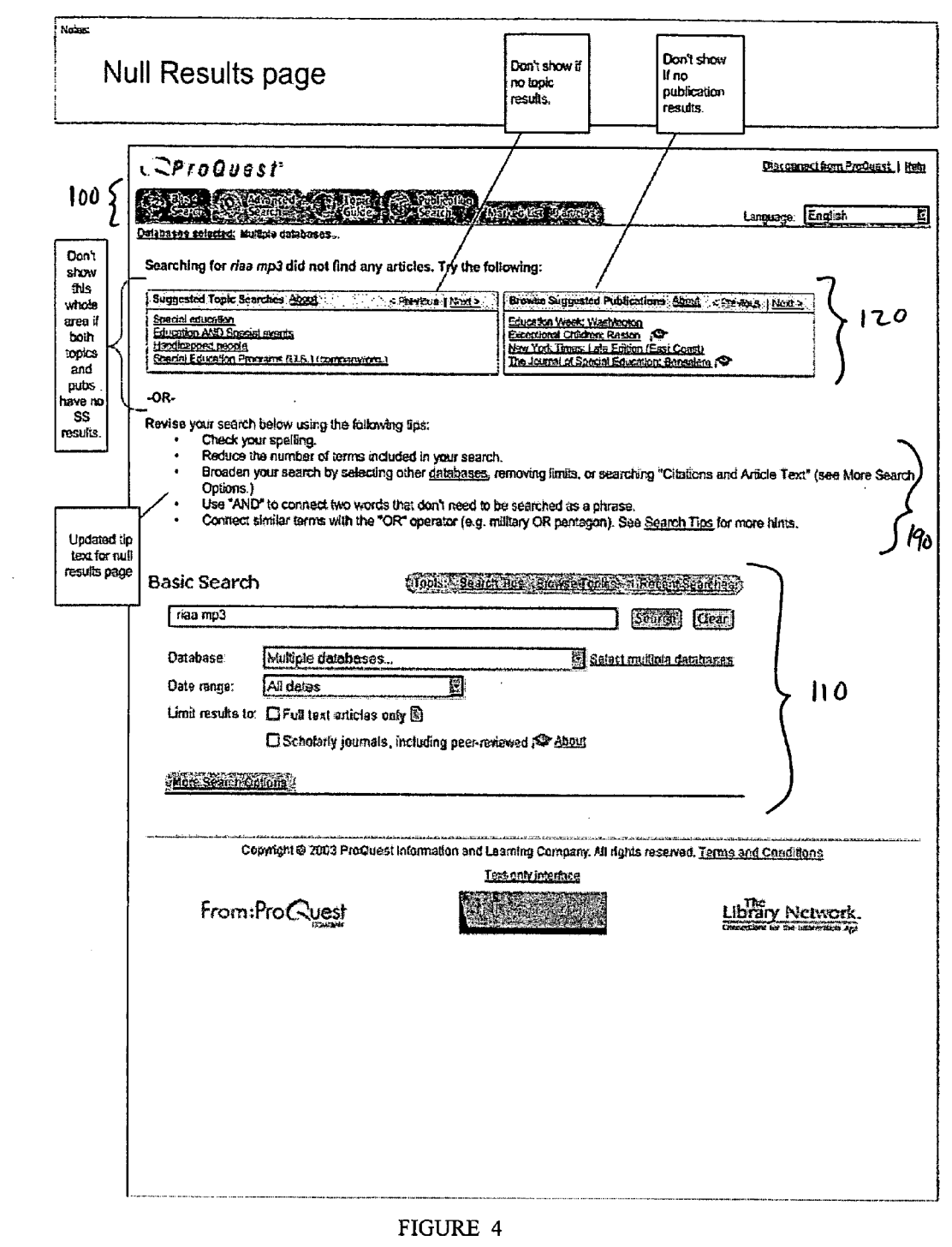

FIG. 4 is an exemplary web page of a search results page appearing when the entered query does not return any traditional results (null results page). When a query is entered that does not return any search results, the null results page of FIG. 4 will state the same under General Navigation tabs 100. Below this statement of null results, the prior query catching section 120 from any preceding search will be presented. Below the Query Catching section 120, a Tips section 190 is presented, providing one or more tips to help the user enter a query which will avoid a null results page. Finally, Basic Search field 110 is presented under the Tips section 190 so that the user can modify the query and/or search.

Figure 5:
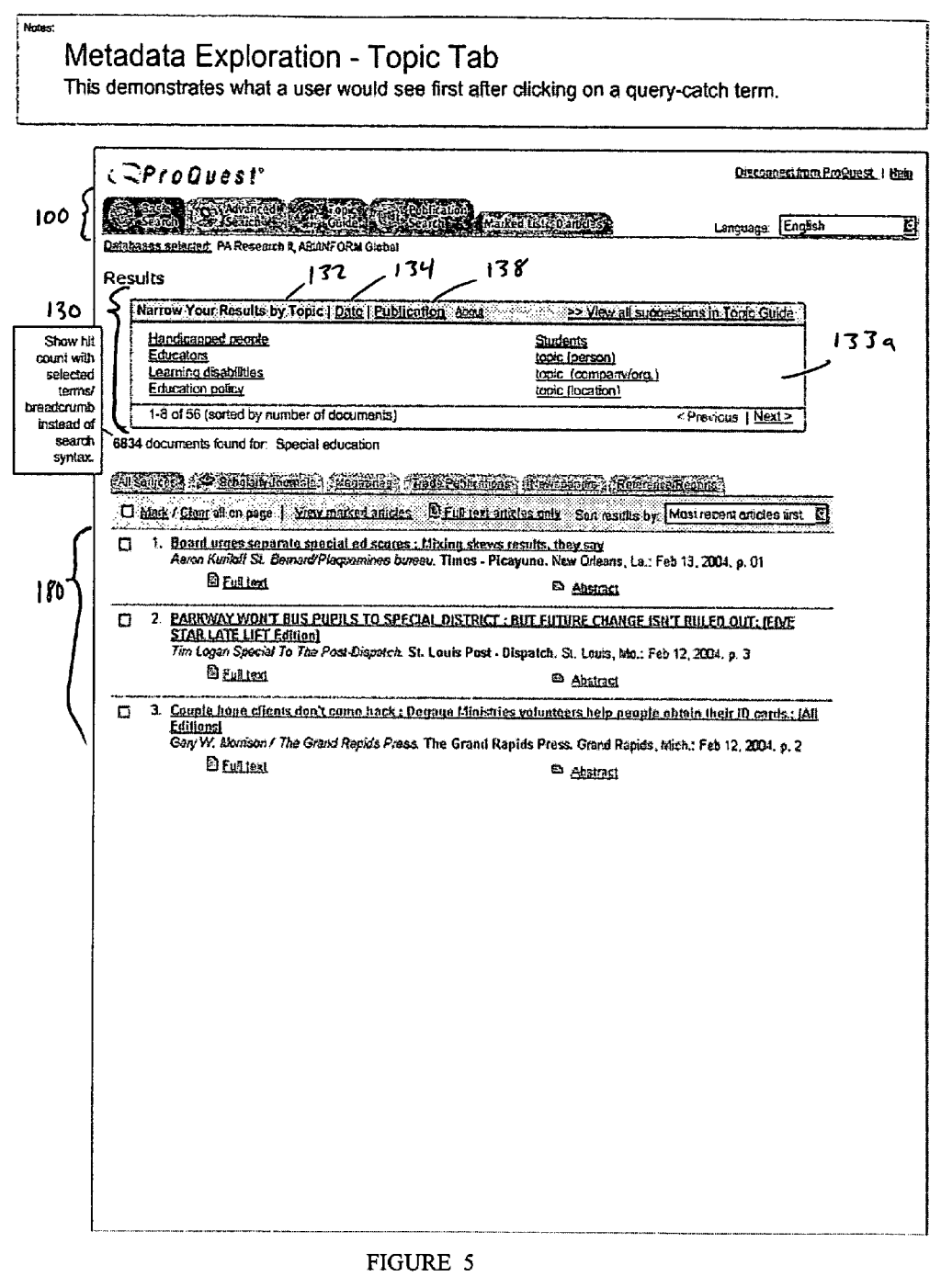

FIG. 5 is an exemplary web page of a search results page enhanced through the selection of a query-catch term from Query Catching Section 120, and illustrating the topic tab metadata exploration feature of the preferred embodiment of the present disclosure. When a user selects a suggested topic from the Suggested Topic Searches Window 122 of Query Catching Section 120 of a search results page such as the search results page illustrated in FIG. 2, the user is presented with a new search results page as illustrated in FIG. 5, having enhanced search results, and displaying the metadata exploration feature of the preferred embodiment of the present disclosure.

The results of the metadata exploration feature of the disclosed method and system are displayed in metadata exploration section 130. This section 130 presents the user with a metadata Topic Tab 132, a metadata Date Tab 134, and a metadata Publication Tab 138, along with a window presenting a list of topics associated with a respective one of the Topic Tab 132, the Date Tab 134 and the Publication Tab 138 (the Topic Tab 132 as illustrated in FIG. 5).

The Metadata Exploration Section 130 presents a list of topics, dates and/or publications generated by the metadata exploration feature of the disclosed method and system in response to the user's query. Each suggested topic, date or publication is presented as a hyperlink. Preferably, metadata exploration section 130 is presented both before and after Traditional Search Results section 180. It should be understood however, that the metadata exploration section 120 could be present any number of times or in any location on the search results page, such as only once at the top, at the bottom or along a side of the results page. Additionally, while not illustrated in FIG. 5, Basic Search field 110 is preferably provided on the results page, at the bottom, or elsewhere, to allow the search to be modified. This is preferred for all search results pages.

As can be seen in FIG. 5, after selecting a suggested topic from the Suggested Topic Searches window 122 of FIG. 2, the metadata Topic Tab 132 is presented by default, or can be selected by the user. Accordingly, in window 133a, a list of additional suggested topics generated by the metadata Topic exploration feature of the disclosed method and system is presented. These additional suggested topics, if selected, will narrow the previously conducted search, eliminating from the prior search results those results which do not also correspond to the selected topic from window 133a.

Each time a suggested topic from window 133a is selected, a new search results page will appear, which will include a metadata exploration section 130. In this manner, a user can continue to narrow the previous search results by choosing additional suggested topics from window 133a. This process can continue until all possible topic choices have been exhausted, or until only a relatively small number of search results remain, which are relevant to, fall within or meet the criteria of all of the selected topics.

Figure 6:
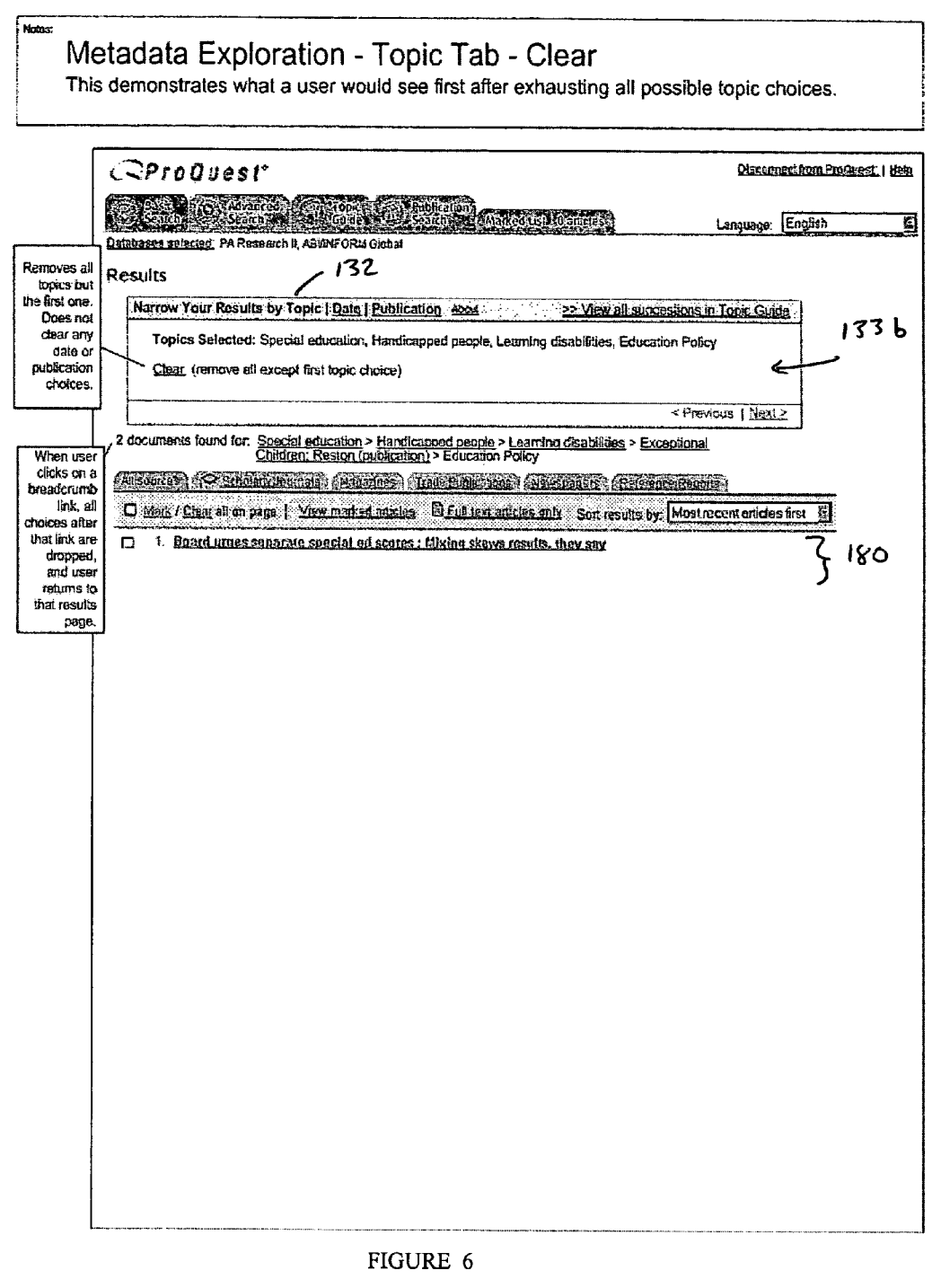

FIG. 6 is an exemplary web page of a search results page (clear topics page) presented after a user has exhausted all possible topic choices of the metadata topic tab 132 of the preferred embodiment of the present disclosure. In window 133b, the user is presented with a list of the topics which the user selected, in the order the user selected them. The user is also presented with a Clear option, selection of which will remove all topic choices except for the first topic choice. As a result, the user will return to or again be presented with the search results page illustrated in FIG. 5. In this manner, the user is easily able to conduct multiple searches using different narrowing topic strings.

Figure 7:
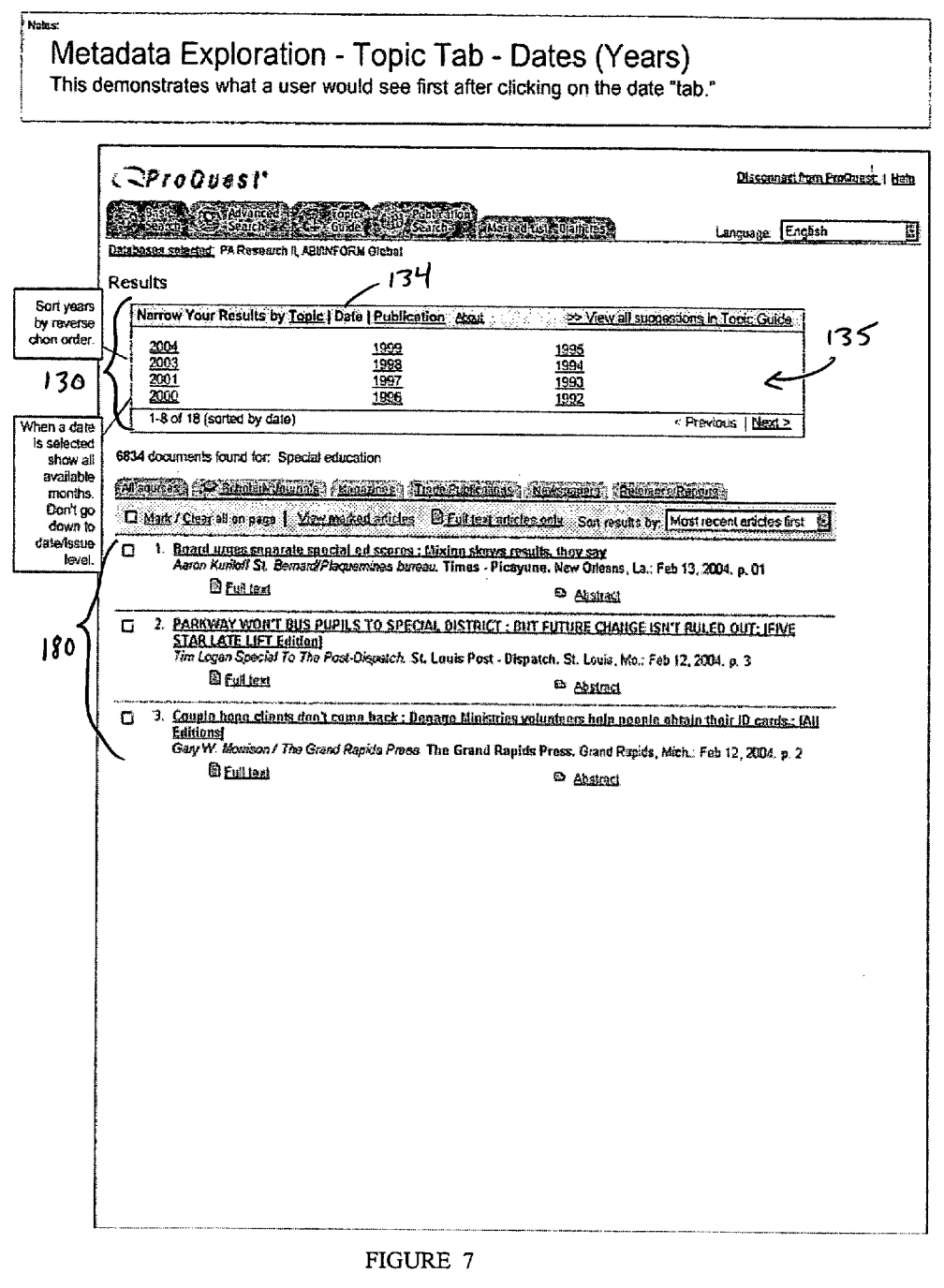

At any time during a user's search while the metadata exploration section 130 is displayed, the user can select the metadata Date Tab 134. FIG. 7 is an exemplary web page of a search results page enhanced through the selection of a query-catch term, and illustrating the dates (years) tab 134 of the metadata exploration feature of the preferred embodiment of the present disclosure. Specifically, FIG. 7 illustrates the search result page presented to a user when the user selected the date tab 134 from the search results page illustrated in FIG. 5.

Upon selection of the date tab 134, window 135 displays a list of years, presented as hyperlinks. These years, if selected, will narrow the previously conducted search, eliminating from the prior search results those results which do not also correspond to the selected year from window 135.

Figure 8:
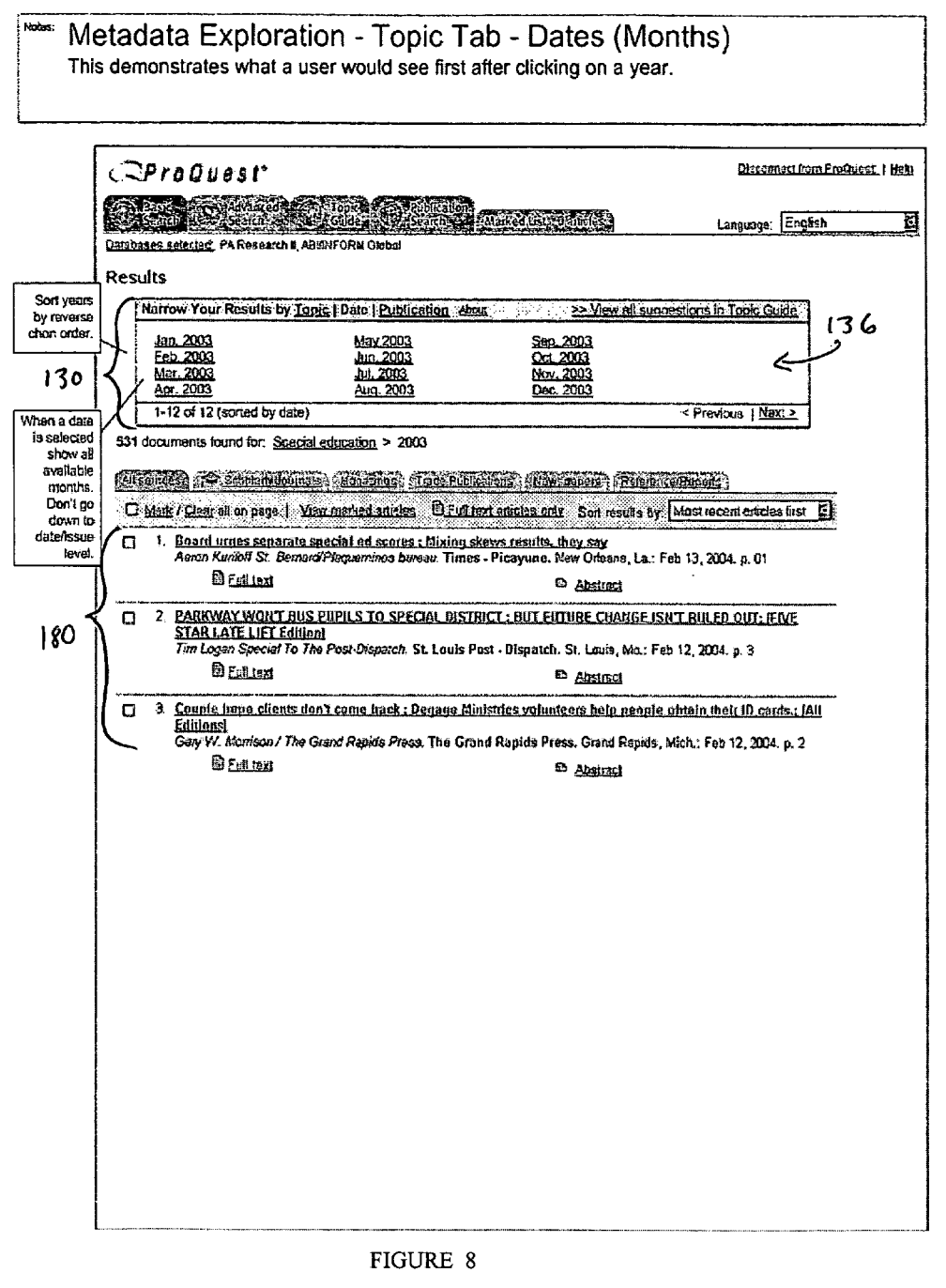

When a specific year from window 135 is selected, a new search results page will appear, providing the narrowed search results corresponding to the selected year, as well as another metadata exploration section 130 having window 136, as illustrated in FIG. 8. Window 136 displays a list of months for the selected year, presented as hyperlinks. These months, if selected, will further narrow the previously conducted search, eliminating from the prior search results those results which do not also correspond to the selected month from window 136, as illustrated in FIG. 9. In this manner, a user can narrow the previous search results by choosing a specific year, and then further narrow the search results by choosing a specific month in that year.

FIG. 9 is an exemplary web page of a search results page (clear dates page) presented after a user has exhausted all possible narrowing date choices of the date tab metadata exploration feature of the preferred embodiment of the present disclosure. Once a user has narrowed the search results as much as allowed, by year and by month in this example, window 137 is displayed on the search results page. In window 137, the user is presented with an identification of the selected month and year. The user is also presented with a Clear option, selection of which will remove all date choices. As a result, the user will return to or again be presented with the search results page the user was at prior to selecting a date, i.e., the search results page of FIG. 7 in this example. In this manner, the user is easily able to conduct multiple searches using different narrowing dates, including years and months with a specific year.

Figure 10:
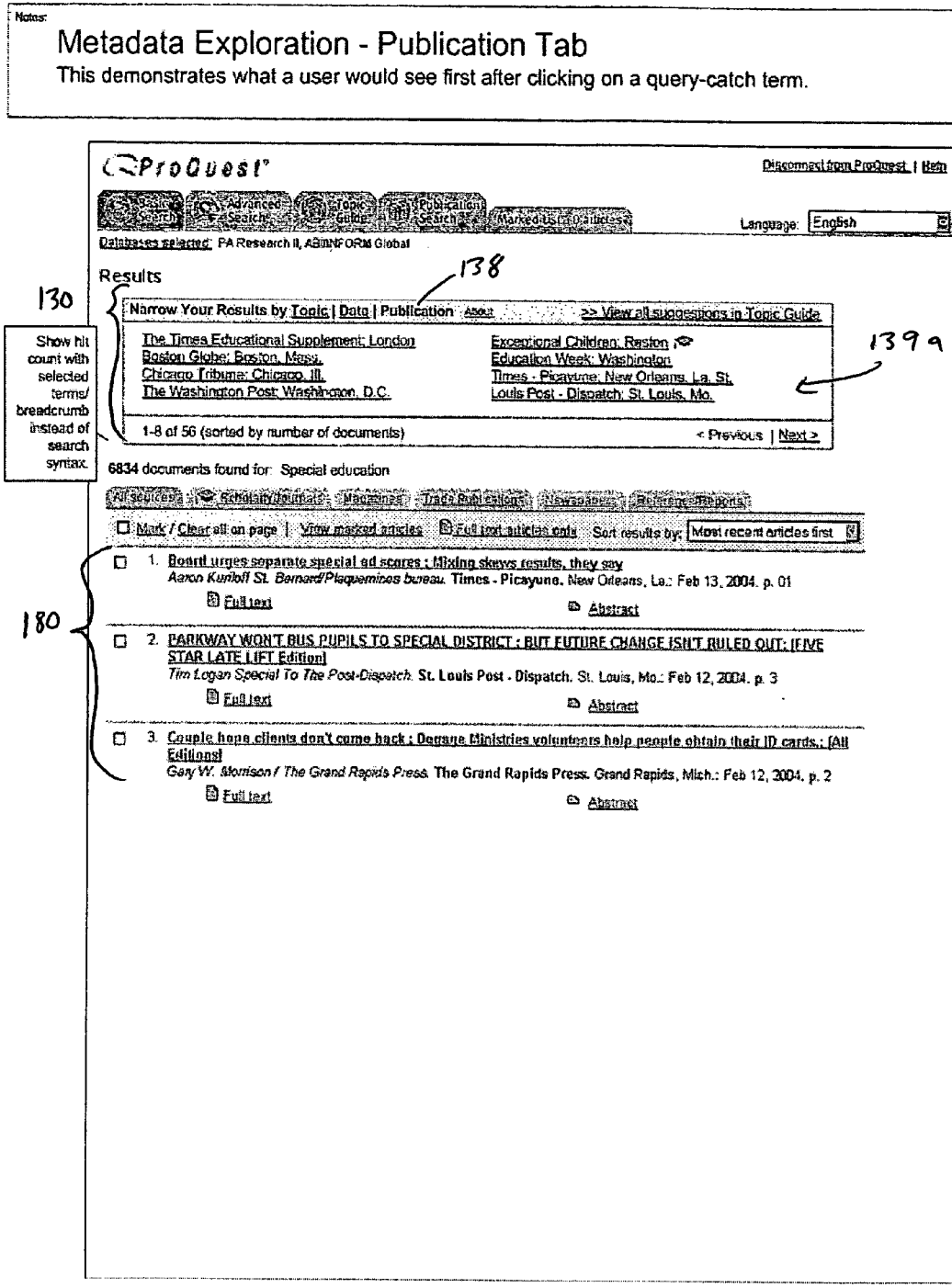
FIG. 10 is an exemplary web page of a search results page enhanced through the selection of a query-catch term, and illustrating the publication tab metadata exploration feature of the preferred embodiment of the present disclosure.

At any time during a user's search while the metadata exploration section 130 is displayed, the user can select the metadata Publication Tab 138. FIG. 10 is an exemplary web page of a search results page enhanced through the selection of a query-catch term, and illustrating the publication tab 138 of the metadata exploration feature of the preferred embodiment of the present disclosure. Specifically, FIG. 10 illustrates the search result page presented to a user when the user selected the date tab 138 from the search results page illustrated in FIG. 5.

Figure 11:
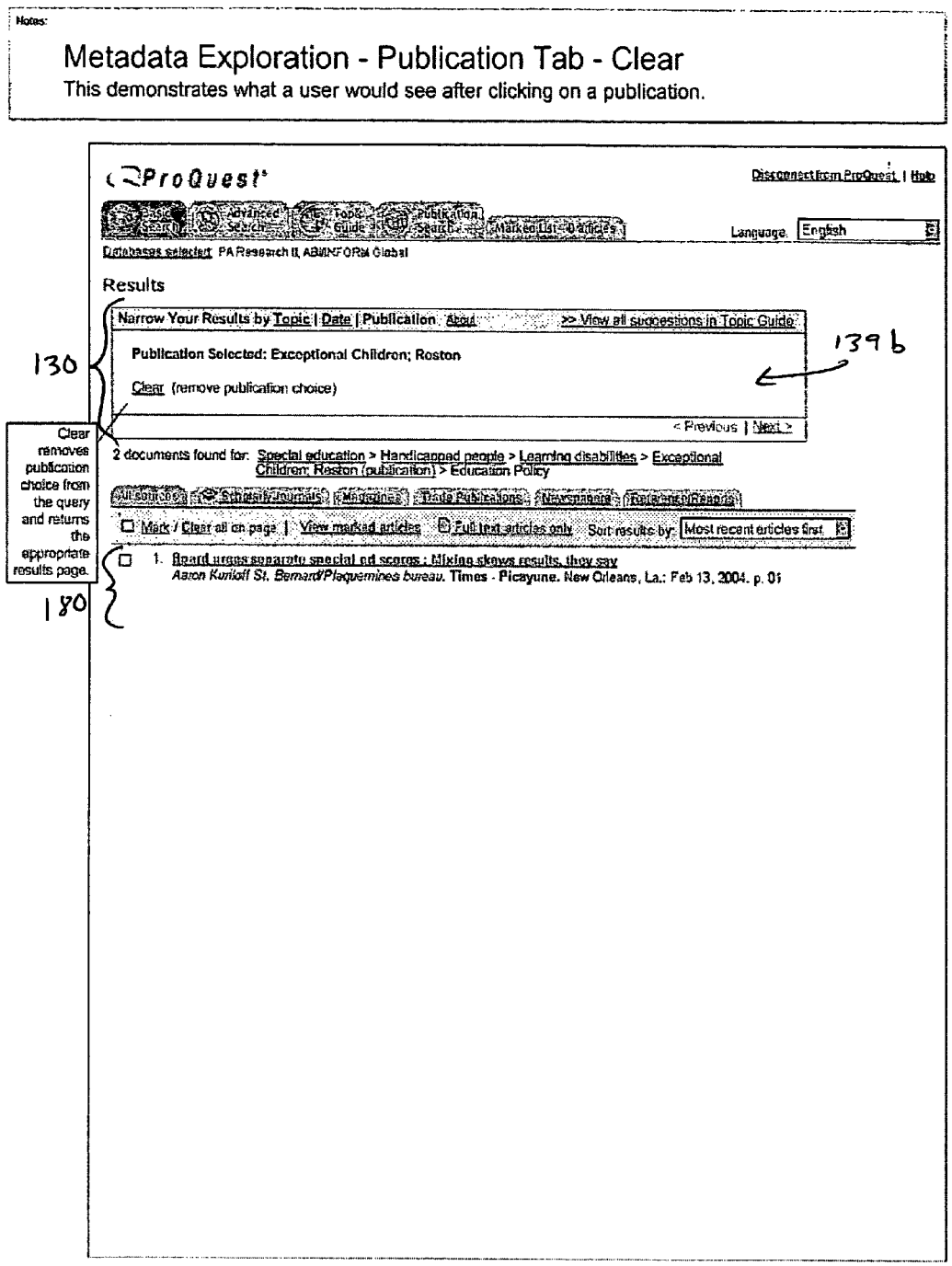
FIG. 11 is an exemplary web page of a search results page (clear publication page) presented after a user has selected a publication choice of the publication tab metadata exploration feature of the preferred embodiment of the present disclosure.

Upon selection of the publication tab 138, window 139a displays a list of publications, presented as hyperlinks. These publications, if selected, will narrow the previously conducted search, eliminating from the prior search results those results which do not also correspond to the selected publication from window 139a. When a specific publication from window 139a is selected, a new search results page will appear, providing the narrowed search results corresponding to the selected publication, as illustrated in FIG. 11. In this manner, a user can narrow the previous search results by choosing a specific publication.

FIG. 11 is an exemplary web page of a search results page (clear publication page) presented after a user has selected a publication choice of the metadata publication tab 138 of the preferred embodiment of the present disclosure. In window 139b, the user is presented with an identification of the publication which the user selected. The user is also presented with a Clear option, selection of which will remove the publication choice. As a result, the user will return to or again be presented with the search results page illustrated in FIG. 10. In this manner, the user is easily able to conduct multiple searches using different narrowing publications.

Figure 12:
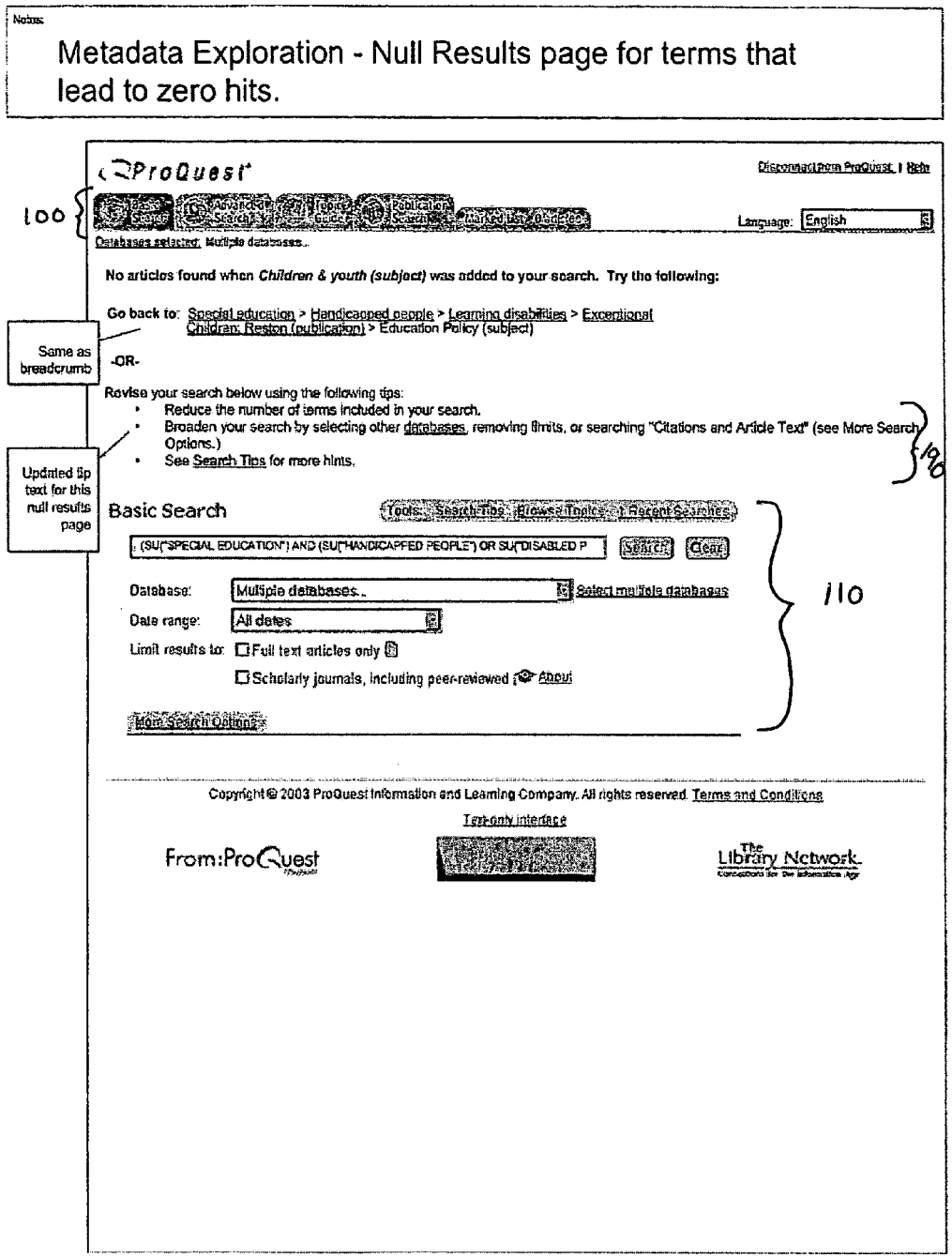
FIG. 12 is an exemplary web page of a search results page (null results page) illustrating the metadata exploration feature of the preferred embodiment of the present disclosure.

It should be understood that the metadata exploration features of the present method and system can be used in any order and/or any desired sequence, and the user remains free to navigate back and forth between the topic tab 132, the date tab 134 and the publication tab 138, until the search results are narrowed satisfactory or until no search results are located for any given search string. FIG. 12 is an exemplary web page of a search results page (null results page) illustrating the metadata exploration feature of the preferred embodiment of the present disclosure when no search results are located.

When a hyperlink from metadata exploration section 130 is selected that does not return any search results, the null results page of FIG. 12 will state the same under General Navigation tabs 100. Below this statement of null results, the current search string will be presented, prompting the user to "Go back to" one of the earlier metadata selections in the search string. Below the identification of the current search string, a Tips section 190 is presented, providing one or more tips to help the user revise the search to avoid a null results page. Finally, Basic Search field 110 is presented under the Tips section 190 so that the user can modify the query and/or search.

While FIGS. 2-12 have herein been described above with respect to a basic search, it should be understood that the above described query catching and metadata exploration features are equally applicable to an advanced search as well. Further, these features are also suitable for other types of searches, as will be described in more detail below.

FIG. 13-19 illustrate the disclosed method and system with respect to a topic guide search. As will be described in more detail below with respect to FIGS. 13-19, a topic guide search is conducted by entering a query, comprising one or more search terms. Suggested topics or a list of topics are provided in response to the query on a topic guide results page, along with options to view the search results responsive to the query, or to the narrow the topics, and the corresponding search results, using the query catching and metadata exploration features of the disclosed method and system.

Figure 13:
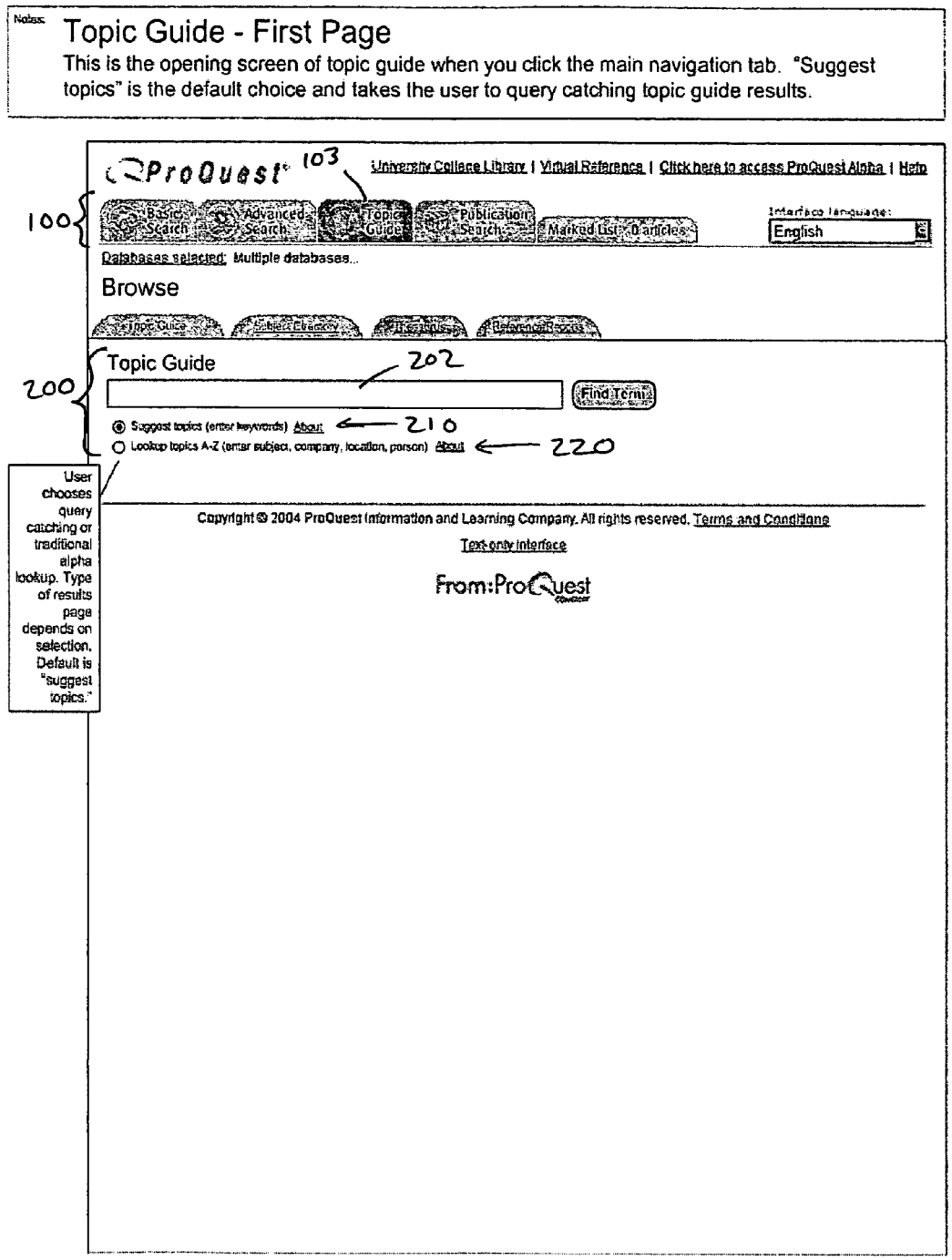
FIG. 13 is an exemplary web page of a search page illustrating the topic guide navigation feature of the preferred embodiment of the present disclosure.

Referring now to FIG. 13, an exemplary web page of a search page illustrating the topic guide navigation feature of the preferred embodiment of the present disclosure is disclosed. With respect to the General Navigation Tabs 100, a user can conduct a search using the Topic Guide Tab 103 of the disclosed method and system. In order to do so, the user would select Topic Guide Tab 103 from the General Navigation Tabs 100. Upon making such a selection, the user is presented with the search page of FIG. 13.

The Topic Guide search page of FIG. 13 presents the user with a Topic Guide Search Field 200. Search field 200 in this example includes a query term entry line 202, and two options for conducting the topic guide search. The first search option, which is preferably the default option, is the Suggest Topics option 210. The second search option is the Lookup Topics A-Z option 220.

The Suggest Topics option 210 provides the user with a list of suggested topics using the query catching feature of the present disclosure. Thus, when the user selects this option 210, and enters a query in query term entry line 202, the user is provided with a list of suggested topics responsive to the entered query, as illustrated in the topic guide suggested topics results page shown in FIG. 14.

The Lookup Topic A-Z option 220 provides the user with an alpha lookup search feature. Thus, when the user selects this option 220, and enters a query in query term entry line 202, the user is provided with an alphabetical list of topics responsive to the entered query, as illustrated in the topic guide A-Z lookup results page shown in FIG. 19.

Figure 14:
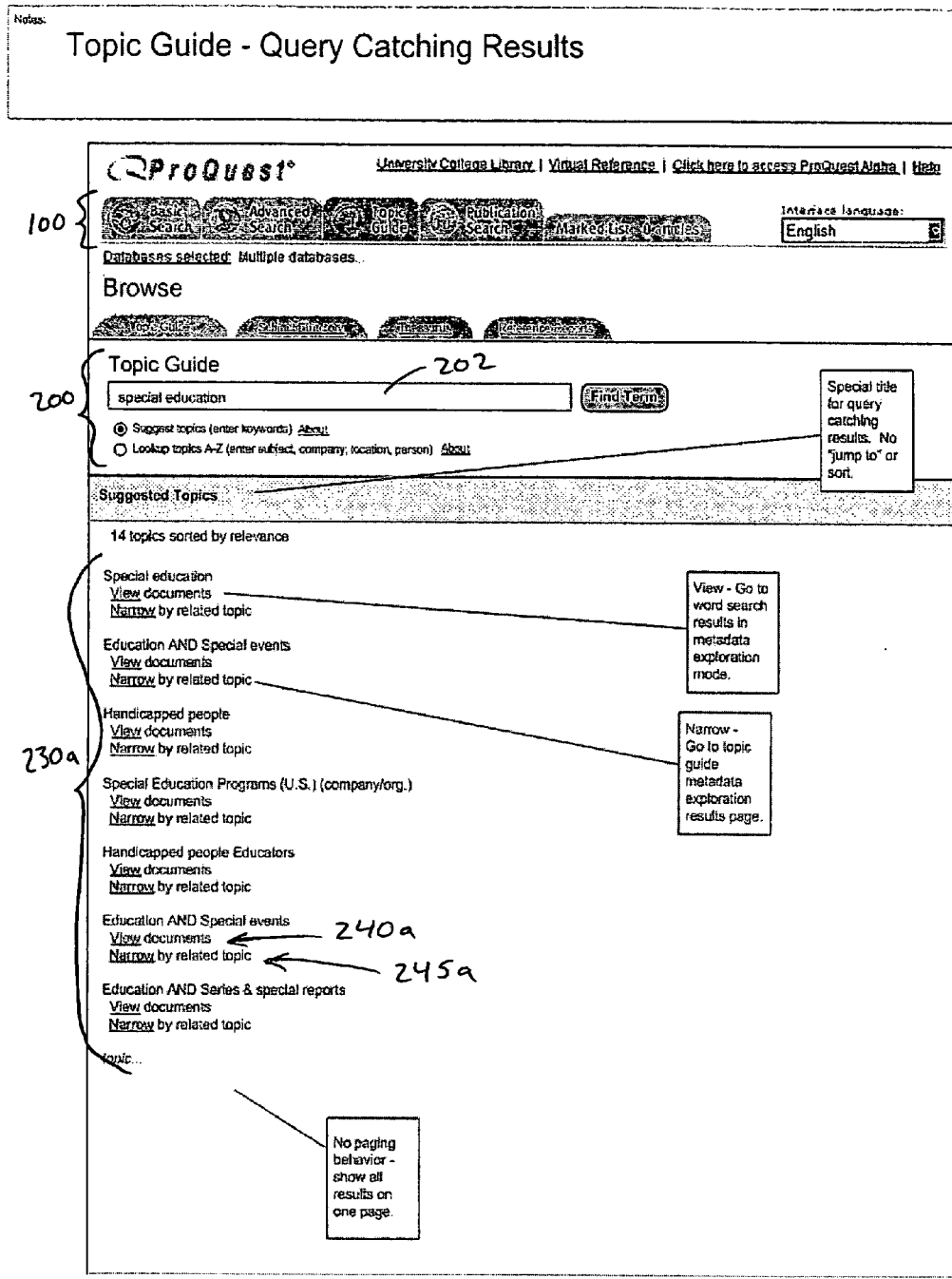
FIG. 14 is an exemplary web page of a suggested topic results page illustrating the query catching feature of the topic guide navigation feature of the preferred embodiment of the present disclosure.

Referring now to FIG. 14, an exemplary web page of a topic guide suggest topics results page is illustrated utilizing the query catching feature of the preferred embodiment of the present disclosure. As can be seen in FIG. 14, the topic guide search field 200, displaying the entered search, is displayed under the general navigation tabs 100. Below the topic guide search field 200 is the topic guide suggested topics results section 230*a*. The topic guide suggested topics results section 230*a* presents a list of the suggested topics located in the search using the query catching feature of the disclosed method and system, along with two options 240*a*, 245*a* for each suggested topic in the search results section 230*a*.

Option 240*a* is a View Documents option. Selection of this option will present the user with a search results page similar to that of FIG. 5, displaying a plurality of search results corresponding to the selected suggested topic, as well as a metadata exploration section for the selected suggested topic. Accordingly, the user is free to navigate through that search results page in the same manner as has been described with respect to FIG. 5.

Option 245*a* is a Narrow by Related Topic option. Selection of this option will present the user with a topic guide metadata exploration page, which will allow the user to narrow the suggested topics using the metadata exploration features of the disclosed method and system. For example, if a user selects the Narrow by Related Topic option under the terms "special education," i.e., the first suggested topic listed in Section 230*a* of FIG. 14, the user will be presented with the topic guide metadata exploration page of FIG. 15.

Figure 15:
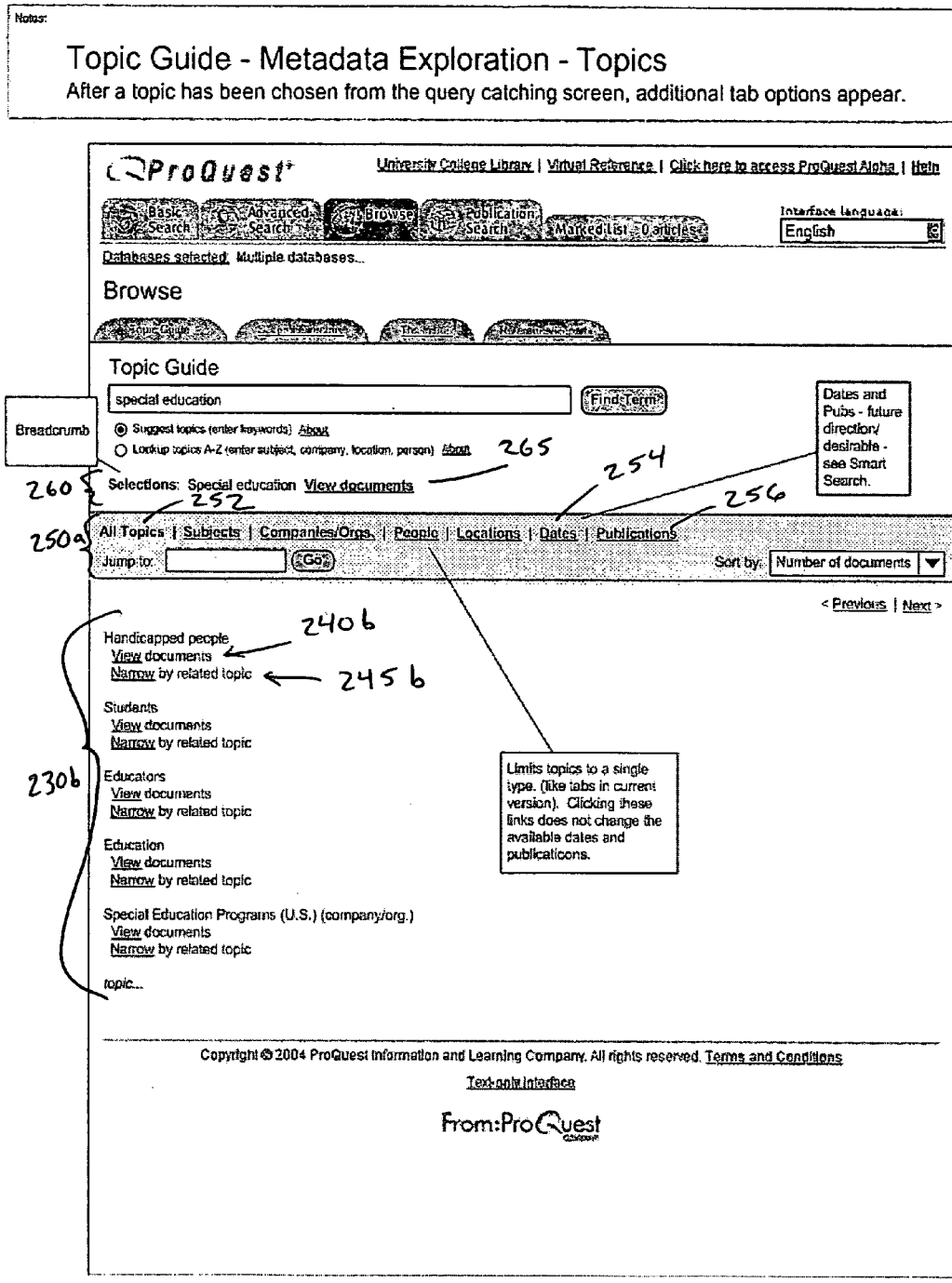
FIG. 15 is an exemplary web page of a suggested topic results page enhanced through the selection of a topic, and illustrating the topic metadata exploration feature of the topic guide navigation feature of the preferred embodiment of the present disclosure.

FIG. 15 is an exemplary web page of a topic results page enhanced through the selection of a Narrow by Related Topic option 245*a* of a suggested topic of section 230*a*, and illustrating the topic metadata exploration feature of the topic guide navigation feature of the preferred embodiment of the present disclosure. The web page of FIG. 15 is similar to that of FIG. 14, except that the user is presented with topic guide navigation tabs 250*a*, above a modified, revised or updated topic guide suggested topics results section 230*b*. These navigation tabs 250*a* include a metadata exploration topic tab 252, a metadata exploration date tab 254, and a metadata exploration publication tab 256, along with other traditional search results navigation tabs. In FIG. 15, the metadata exploration topic tab 252 has been defaulted to upon selecting a Narrow by Related Topic option 245*a* from the page of FIG. 14.

Accordingly, the Topic Guide Suggested Topics Results Section 230*b* in FIG. 15 presents the user with additional topics which the user may select to further narrow a search, the results of which remain hidden until a View Documents option 240*b* is selected. Each time a user selects a Narrow by Related Topic option 245*b* from the Topic Guide Suggested Topics Section 230*b*, the hidden search is further narrowed by eliminating from the search those results which do not correspond to the respective suggested topic under which the option 245*b* was chosen, as well as all previously chosen suggested topics.

After the user narrows the search by topic (option 245*b*) any desired number of times, the user may select the View Documents option 240*b* under any remaining suggested topic in section 230*b*, and the hidden search results will be presented in a search results page similar to FIG. 6. These search results will have been narrowed according to all of the user's prior selections, and the user will be free to navigate through that search results page in the same manner as has been described with respect to FIG. 6.

It should be understood that each time an option 245*b* under a suggested topic from section 230*b* is selected, a new page will appear, which will include a modified section 230*b*, as well as navigation tabs 250*a*. In this manner, a user can continue to narrow the previous search results by choosing additional narrow options 245*b* under any suggested topic from section 230*b*, or by choosing a different metadata exploration tab 252, 254*b* or 256. This process can continue until all possible topic choices have been exhausted, or until only a relatively small number of search results remain, which are relevant to, fall within or meet the criteria of all of the selected topics.

To remind the user of all of the user's selections in this process, a Topic Guide Summary Line 260 is presented, identifying each of the user's selections, in the order of selection. A View Documents option 265 is provided at the end of the Topic Guide Summary Line 260, allowing the user to access the hidden search results without further narrowing. Optionally, a count of the hidden search results could be provided after any or all of the View Documents options so that a user will be able to immediately recognize how many search results are available.

Figure 16:
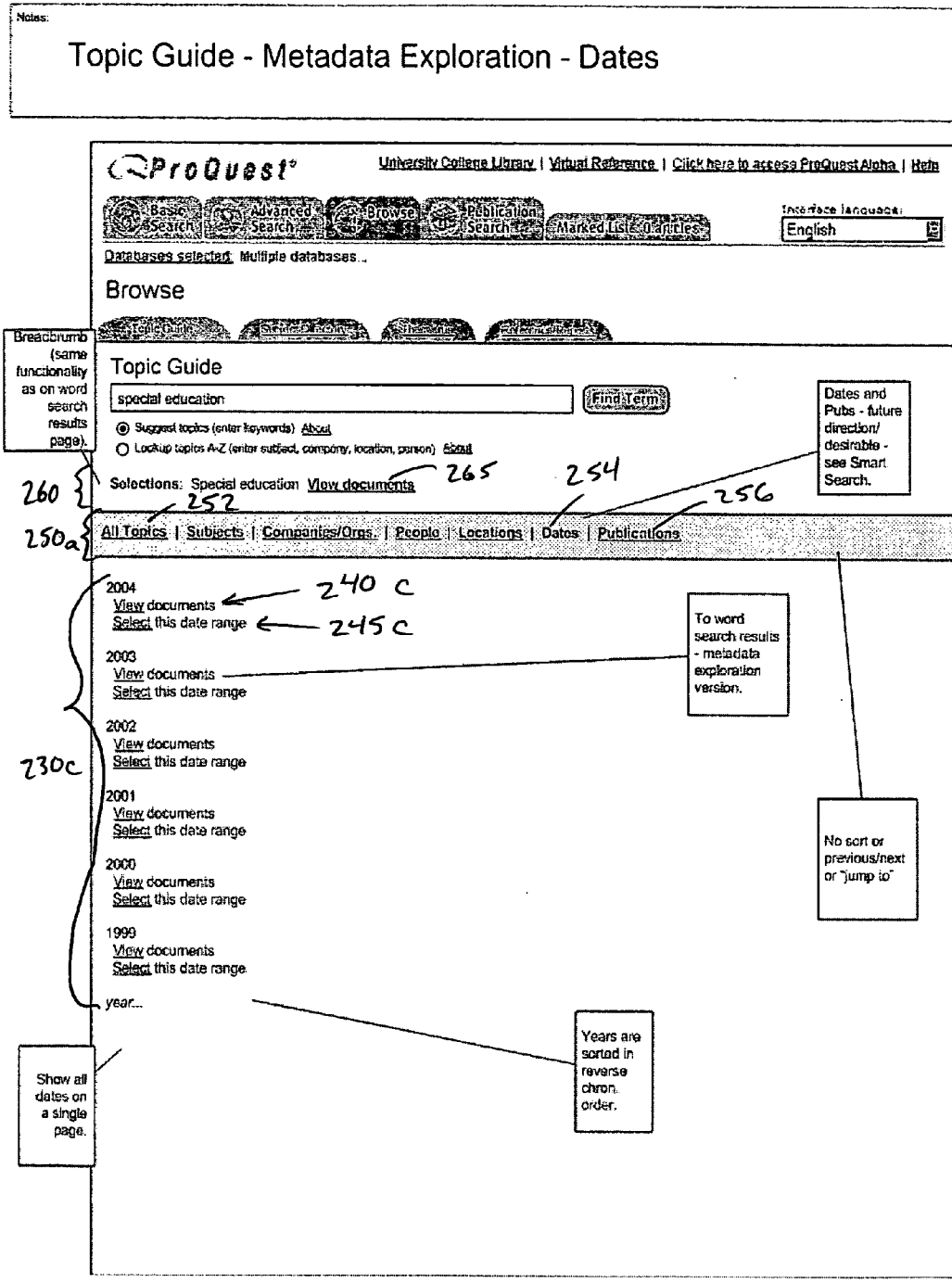
FIG. 16 is an exemplary web page of a suggested topic results page enhanced through the selection of a topic, and illustrating the dates metadata exploration feature of the topic guide navigation feature of the preferred embodiment of the present disclosure.

At any time during a user's topic guide search while the topic guide navigation tabs 250*a* are displayed, as in FIG. 15, the user can select the metadata Dates Tab 254. FIG. 16 is an exemplary web page of a topic guide results page enhanced through the selection of a topic via option 245*a* of FIG. 14, and illustrating the dates metadata exploration feature of the topic guide navigation feature of the preferred embodiment of the present disclosure. Specifically, FIG. 16 illustrates the topic guide results page presented to a user when the user selects the dates tab 254 from the topic guide results page illustrated in FIG. 15.

Upon selection of the date tab 254, a topic guide results section 230*c* displays a list of years, along with two options 240*c*, 245*c*. Option 240*c* is the View Documents Option, which will take the user to a search results page similar to FIG. 8. The search results will have been narrowed by eliminating from the prior search results those results which do not also correspond to the selected year under which option 240*c* was selected from section 230*c*. The user will then be able to navigate through that search results page in the same manner as has been described with respect to FIG. 8.

Option 245*c* is the Select This Date Range option. When option 245*c* for a specific year from section 230*c* is selected, a new topic guide results page (not shown) will appear and display months for the selected year, along with two options (not shown). One of the options is the View Documents Option, which will take the user to a search results page similar to FIG. 9. The search results will have been narrowed by eliminating from the prior search results those results which do not also correspond to the selected month and year under which the option was selected. The user will then be able to navigate through that search results page in the same manner as has been described with respect to FIG. 9.

Again, it should be understood that a user can continue to narrow the previous search results by choosing a different metadata exploration tab 252, 254*b* or 256. This process can continue until all possible topic choices, years and/or months have been exhausted, or until only a relatively small number of search results remain, which are relevant to, fall within or meet the criteria of all of the selected topics, years and/or months.

As with FIG. 15, the Topic Guide Summary Line 260 is presented in FIG. 16 to remind the user of all of the user's selections in this process, identifying each of the user's selections, in the order of selection. The View Documents option 265 is provided at the end of the Topic Guide Summary Line 260, allowing the user to access the hidden search results without further narrowing.

At any time during a user's topic guide search while the topic guide navigation tabs 250*a* are displayed, as in FIGS. 15 and 16, the user can select the metadata Publications Tab 256. FIG. 17 is an exemplary web page of a topic guide results page enhanced through the selection of a topic via option 245*a* of FIG. 14, and illustrating the publications metadata exploration feature of the topic guide navigation feature of the preferred embodiment of the present disclosure. Specifically, FIG. 17 illustrates the topic guide results page presented to a user when the user selects the publications tab 256 from the topic guide results page illustrated in FIG. 15.

Upon selection of the publications tab 256, a topic guide results section 230*d* displays a list of publications, along with two options 240*d*, 245*d*. Option 240*d* is the View Documents Option, which will take the user to a search results page similar to FIG. 11. The search results will have been narrowed by eliminating from the prior search results those results which do not also correspond to the selected publication under which option 240*d* was selected from section 230*d*. The user will then be able to navigate through that search results page in the same manner as has been described with respect to FIG. 11.

Option 245*d* is the Select This Publication option. When option 245*d* for a specific publication from section 230*d* is selected, a new topic guide results page (not shown) will appear and display additional options (not shown) to assist the user in further defining the search. The user is also presented with a Clear option (not shown), selection of which will remove the publication choice. As a result, the user will return to or again be presented with the search results page illustrated in FIG. 17. In this manner, the user is easily able to conduct multiple searches using different narrowing publications.

Again, it should be understood that a user can continue to narrow the previous search results by choosing a different metadata exploration tab 252, 254 or 256. This process can continue until all possible topic choices, years, months and/or publications have been exhausted, or until only a relatively small number of search results remain, which are relevant to, fall within or meet the criteria of all of the selected topics, years, months and/or publications.

As with FIGS. 15 and 16, the Topic Guide Summary Line 260 is presented in FIG. 17 to remind the user of all of the user's selections in this process, identifying each of the user's selections, in the order of selection. The View Documents option 265 is provided at the end of the Topic Guide Summary Line 260, allowing the user to access the hidden search results without further narrowing.

It should be understood that the metadata exploration features of FIGS. 15-17 can be used in any order and/or any desired sequence, and the user remains free to navigate back and forth between the topics tab 252, the dates tab 254 and the publications tab 256, until the topic guide suggested topics results are narrowed satisfactory or until no topic guide suggested topics results are located for any given search string.

Figure 18:
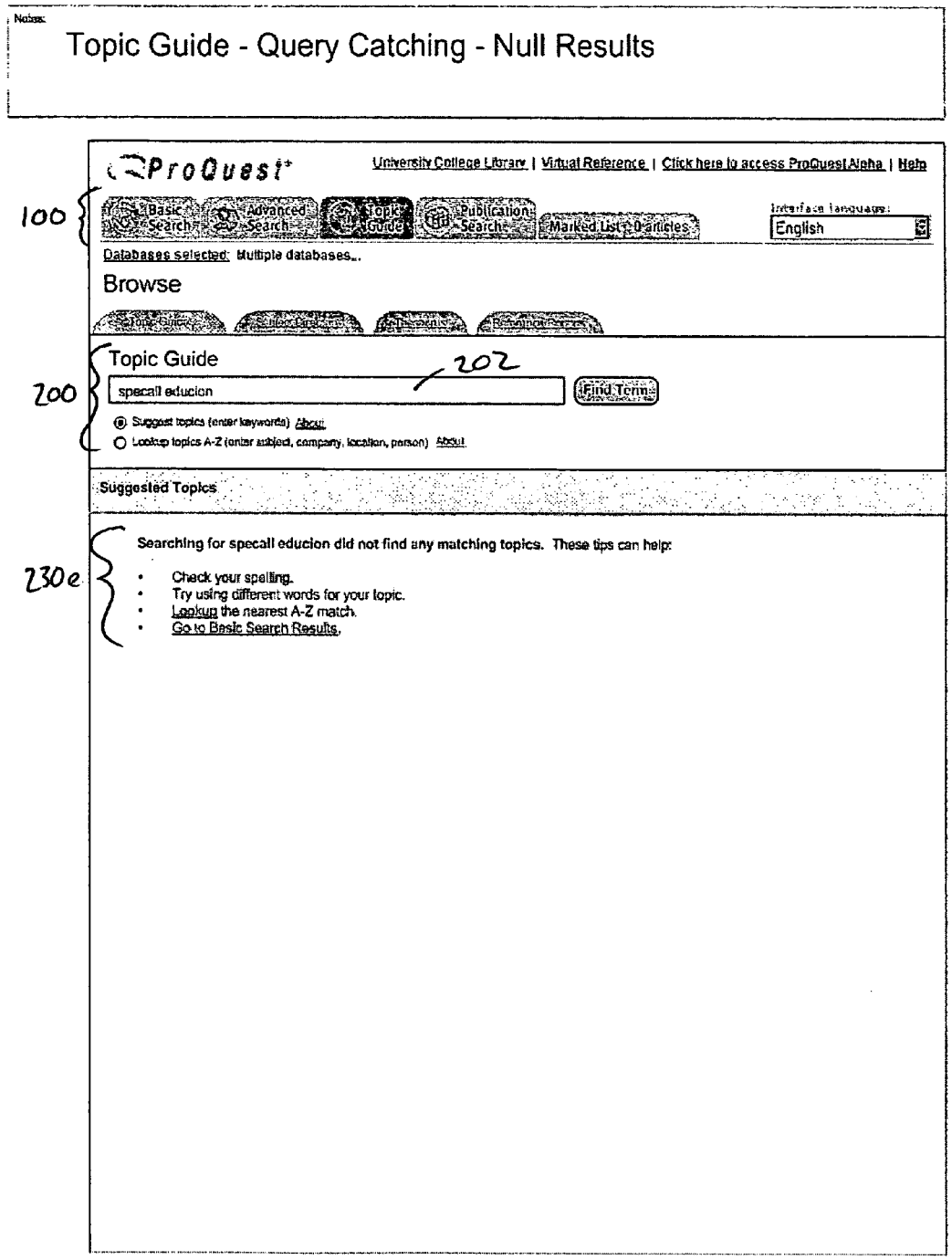
FIG. 18 is an exemplary web page of a suggested topic results page (null results page) illustrating the query catching feature of the topic guide navigation feature of the preferred embodiment of the present disclosure.

FIG. 18 is an exemplary web page of a topic guide results page (null results page) illustrating the query catching feature of the topic guide navigation feature of the preferred embodiment of the present disclosure when no suggested topics results are located from entry of a query in the query term entry line 202 of topic guide search field 200 of FIG. 13.

When no suggested topics corresponding to the entered query are located, the null results page of FIG. 18 will state the same in Topic Guide Results Section 230e. Above this statement of null results, the Topic Guide Search Field 200 will present the current search string in query term entry line 202. In Topic Guide Results Section 230e, below the statement of null results, one or more tips are presented, providing one or more tips to help the user revise the query to avoid a null results page. Also provided in Topic Guide Results Section 230e is an option for the user to "Lookup the nearest A-Z match," and an option for the user to "Go to Basic Search Results." The "Lookup the nearest A-Z match" will present the user with an alphabetical list of one or more suggested topics which are closest alphabetically to the entered query. The "Go to Basic Search Results" option will take the user back to the last displayed results page.

Figure 19:
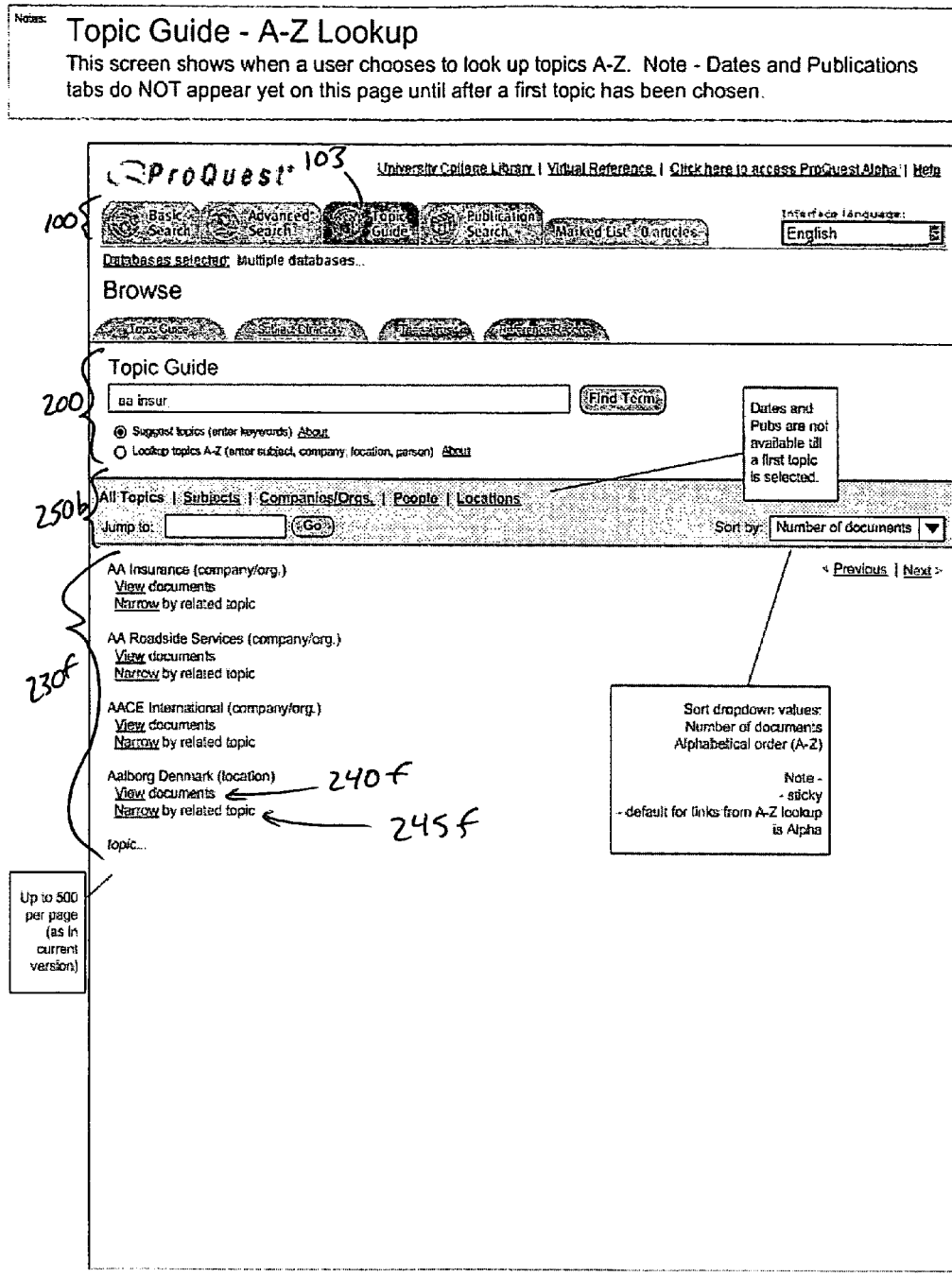
FIG. 19 is an exemplary web page of a topic results page illustrating the A-Z Lookup function of the topic guide navigation feature of the preferred embodiment of the present disclosure.

Referring now to FIG. 19, an exemplary web page of a topic guide results page is shown illustrating the A-Z Lookup function of the topic guide navigation feature of the preferred embodiment of the present disclosure. This page is presented after a user selects the Lookup Topics A-Z option 220 from the Topic Guide page of FIG. 13 and enters a query.

As can be seen in FIG. 19, the topic guide search field 200, displaying the entered search, is displayed under the general navigation tabs 100. Below the topic guide search field 200 is the topic guide results section 230f. The topic guide search results section 230f presents an alphabetical list of the topics responsive to the entered query which were located in the search, along with two options 240f, 250f for each suggested topic in the results section 230f.

Option 240f is a View Documents option. Selection of this option will present the user with a search results page similar to that of FIG. 5, displaying a plurality of search results corresponding to the selected suggested topic, as well as a metadata exploration section for the selected suggested topic. Accordingly, the user is free to navigate through that search results page in the same manner as has been described with respect to FIG. 5.

Option 245f is a Narrow by Related Topic option. Selection of this option will present the user with a topic guide metadata exploration page similar to that of FIG. 15, which will allow the user to narrow the suggested topics using the metadata exploration features of the disclosed method and system.

Also provided on the A-Z Lookup results page of FIG. 19 are Topic Guide Results Navigation Tabs 250b. However, unlike the Navigation Tabs 250a of FIG. 15, these tabs 250b do not include a dates tab and a publications tab. The dates tab and publications tab will appear after an initial topic is selected from Topic Guide Results Section 230f.

Figure 20:
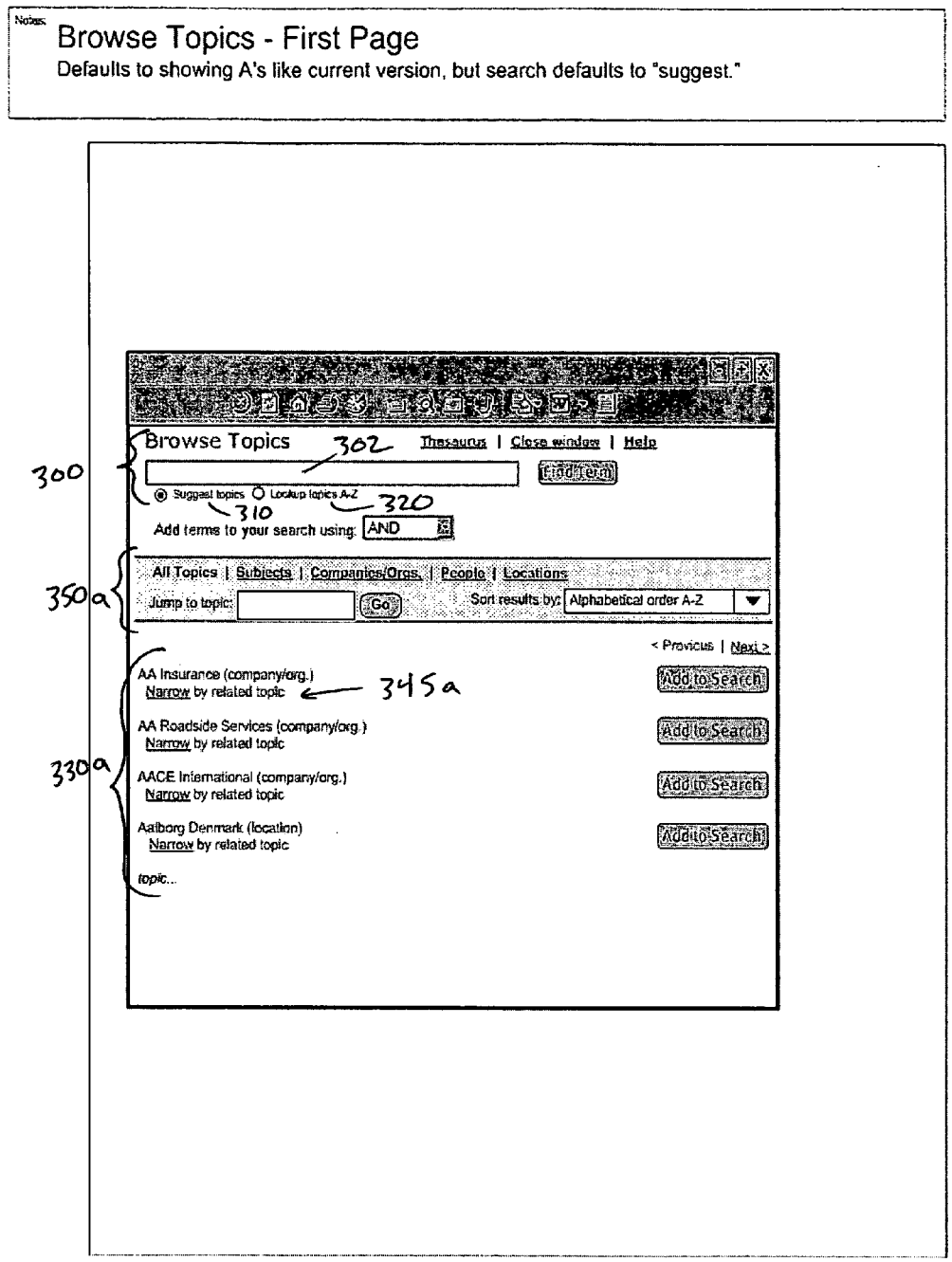
FIG. 20 is an exemplary web page of a browse topics page illustrating the browse topics navigation feature of the preferred embodiment of the present disclosure.
Figure 21:
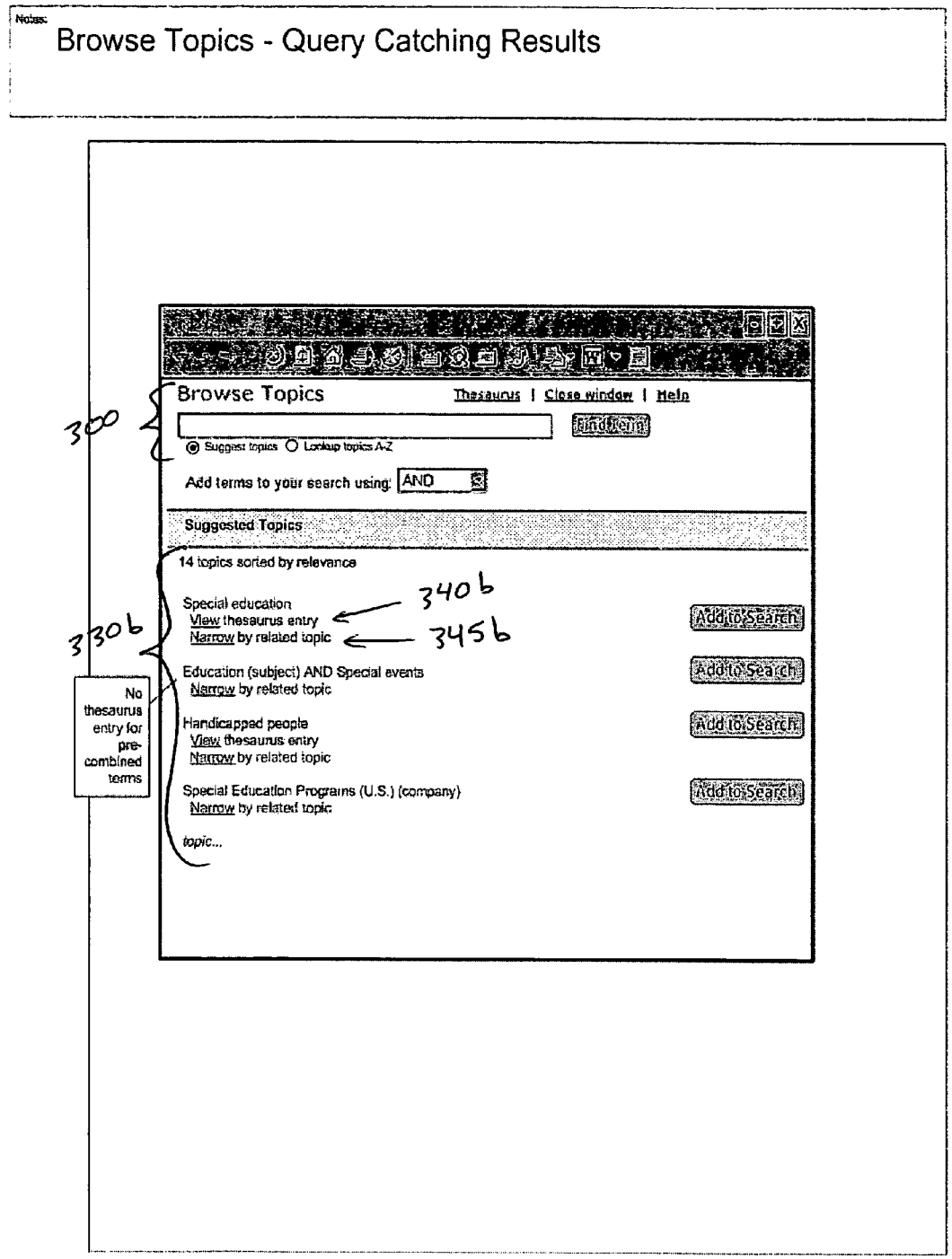
FIG. 21 is an exemplary web page of a browse topics results page illustrating the query catching feature of the browse topics navigation feature of the preferred embodiment of the present disclosure.
Figure 22:
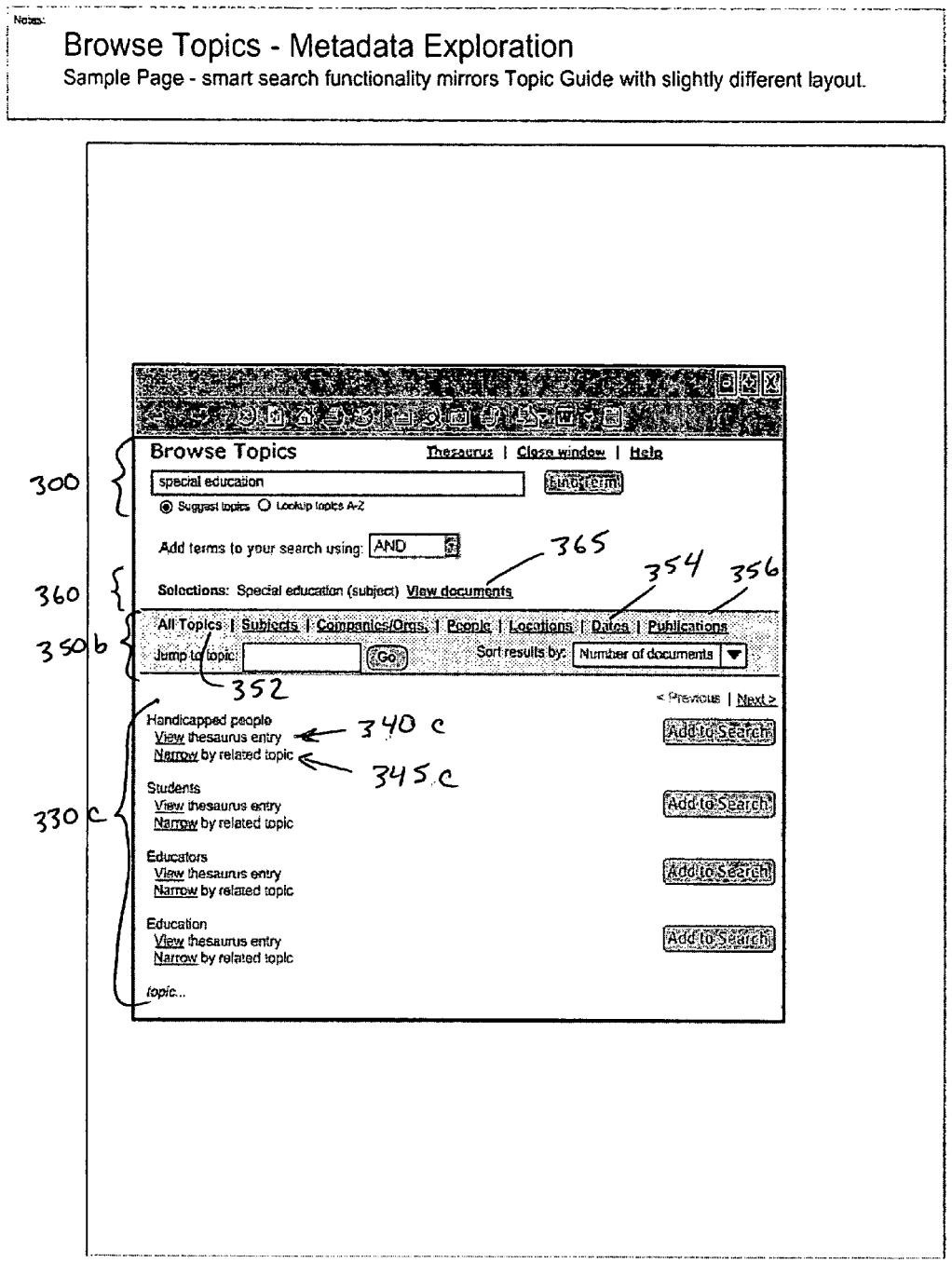
FIG. 22 is an exemplary web page of a browse topics results page enhanced through the selection of a topic, and illustrating the topic metadata exploration feature of the browse topics navigation feature of the preferred embodiment of the present disclosure.

FIG. 20-22 illustrate the disclosed method and system with respect to a browse topics search. The browse topics feature of the disclosed method and system preferably takes the form of a pop-up tool which allows the user to browse topics at any point in the system via a pop-up window. The browse topics pop-up window is similar to the Topic Guide search and incorporates the query catching features and metadata exploration features described above for the Topic Guide.

Referring now to FIG. 20, an exemplary web page of a search page illustrating the browse topics navigation feature of the preferred embodiment of the present disclosure is disclosed. The Browse Topics search page of FIG. 20 presents the user with a Browse Topics Search Field 300. Search field 300 in this example includes a query term entry line 302, and two options for conducting the browse topic search. The first search option, which is preferably the default option, is the Suggest Topics option 310. The second search option is the Lookup Topics A-Z option 320.

The Browse Topics search page of FIG. 20 also presents the user with a list of topics in a Browse Topics Section 330a, and browse topics navigation tabs 350a which include traditional navigation tabs. The Browse Topics Section 330a provides the user with a complete list of topics through which the user can browse. Under each listed topic is a Narrow by Related Topic option 345a. Selection of this option 345a will present the user with a browse topics results page with the metadata exploration feature of the disclosed method and system, similar to that illustrated in FIG. 22, discussed in more detail below.

The Suggest Topics option 310 allows the user to search through and narrow down the list of topics presented in the browse topics section 330a using the query catching feature of the present disclosure. Thus, when the user selects this option 310, and enters a query in query term entry line 302, the user is provided with a list of suggested topics responsive to the entered query, as illustrated in the browse topics suggested topics result page shown in FIG. 21.

The Lookup Topic A-Z option 320 provides the user with an alpha lookup search feature. Thus, when the user selects this option 320, and enters a query in query term entry line 302, the user is provided with an alphabetical list of topics responsive to the entered query, similar to the topic guide A-Z lookup search result page shown in FIG. 19.

Referring now to FIG. 21, an exemplary web page of a browse topics suggested topics results page is illustrated utilizing the query catching feature of the preferred embodiment of the present disclosure. As can be seen in FIG. 21, the browse topics search field 300 is presented, (displaying the entered search). Below the browse topics search field 300 is the browse topics suggested topics results section 330b. The browse topics suggested topics results section 330b presents a list of the suggested topics located in the search using the query catching feature of the disclosed method and system, along with two options 340b, 345b for each suggested topic in the results section 330b.

Option 340b is a View Thesaurus Entry option. Selection of this option will present the user with a page (not shown) displaying one or more thesaurus entries corresponding to the topic under which the option 340b was selected. The user can select any of the thesaurus entries to narrow the search with respect to the topic of the thesaurus entry, if desired.

Option 345b is a Narrow by Related Topic option. Selection of this option will present the user with a browse topics metadata exploration page, which will allow the user to narrow the suggested topics using the metadata exploration features of the disclosed method and system. For example, if a user selects the Narrow by Related Topic option under the terms "special education," i.e., the first suggested topic listed in Section 330b of FIG. 21, the user will be presented with the browse topics metadata exploration page of FIG. 22.

FIG. 22 is an exemplary web page of a browse topics results page enhanced through the selection of a Narrow by Related Topic option 345b of a suggested topic of section 330b of FIG. 21, and illustrating the topic metadata exploration feature of the browse topics feature of the preferred embodiment of the present disclosure. The web page of FIG. 22 is similar to that of FIG. 21, except that the user is presented with navigation tabs 350*b*, above a modified, revised or updated browse topics suggested topics results section 330*c*. These browse topics navigation tabs 350*b* include a metadata exploration topics tab 352, a metadata exploration dates tab 354, and a metadata exploration publications tab 356, along with other traditional search results navigation tabs. In FIG. 22, the metadata exploration topics tab 352 has been defaulted to upon selecting a Narrow by Related Topic option 345*b* from the page of FIG. 21.

Accordingly, the Browse Topics Suggested Topics Results Section 330*c* in FIG. 22 presents the user with additional topics which the user may select to further narrow a search, the results of which remain hidden until a View Documents option 365 is selected from a browse topics summary line 360. Each time a user selects a Narrow by Related Topic option 345*c* from the Browse Topics Suggested Topics Section 330*c*, the hidden search is further narrowed by eliminating from the search those results which do not correspond to the respective suggested topic under which the option 345*c* was chosen, as well as all previously chosen suggested topics.

After the user narrows the search by topic any desired number of times, the user may select the View Documents option 365 in the browse topics summary line 360, and the hidden search results will be presented in a search results page similar to FIG. 6. These search results will have been narrowed according to all of the user's prior selections, and the user will be free to navigate through that search results page in the same manner as has been described with respect to FIG. 6.

It should be understood that each time an option 345*c* under a suggested topic from section 330*c* is selected, a new page will appear, which will include a modified section 330*c*, as well as navigation tabs 350*b*. In this manner, a user can continue to narrow the previous results by choosing additional narrow options 345*c* under any suggested topic from section 330*c*, or by choosing a different metadata exploration tab 352, 354 or 356. This process can continue until all possible topic choices have been exhausted, or until only a relatively small number of search results remain, which are relevant to, fall within or meet the criteria of all of the selected topics.

At any time during a user's browse topics search while the navigation tabs 350*b* are displayed, as in FIG. 22, the user can select the metadata Dates Tab 354 or the metadata Publications tab 356. When a user selects the Dates tab 354, a browse topics results page enhanced through the selection of a topic via option 345*a* of FIG. 21, and illustrating the dates metadata exploration feature of the browse topics navigation feature of the preferred embodiment of the present disclosure is presented, similar to the page illustrated in FIG. 16. That page (not shown) will display a list of list of years, along with an option to further narrow the result by month.

When the user selects the Publications tab 356, a browse topics results page enhanced through the selection of a topic via option 345*b* of FIG. 21, and illustrating the publications metadata exploration feature of the browse topics navigation feature of the preferred embodiment of the present disclosure is presented, similar to the page illustrated in FIG. 17. That page (not shown) will display a list of publications, along with an option to select a specific publication.

Again, it should be understood that a user can continue to narrow the previous results by choosing a different metadata exploration tab 252, 254*b* or 256. This process can continue until all possible topic choices, years, months and/or publications have been exhausted, or until only a relatively small number of search results remain, which are relevant to, fall within or meet the criteria of all of the selected topics, years, months and/or publications.

It should be understood that the metadata exploration features of FIG. 22 can be used in any order and/or any desired sequence, and the user remains free to navigate back and forth between the topic tab 352, the date tab 354 and the publication tab 356, until the browse topics suggested topics results are narrowed satisfactory or until no browse topics suggested topics results are located for any given search string.

Figure 23:
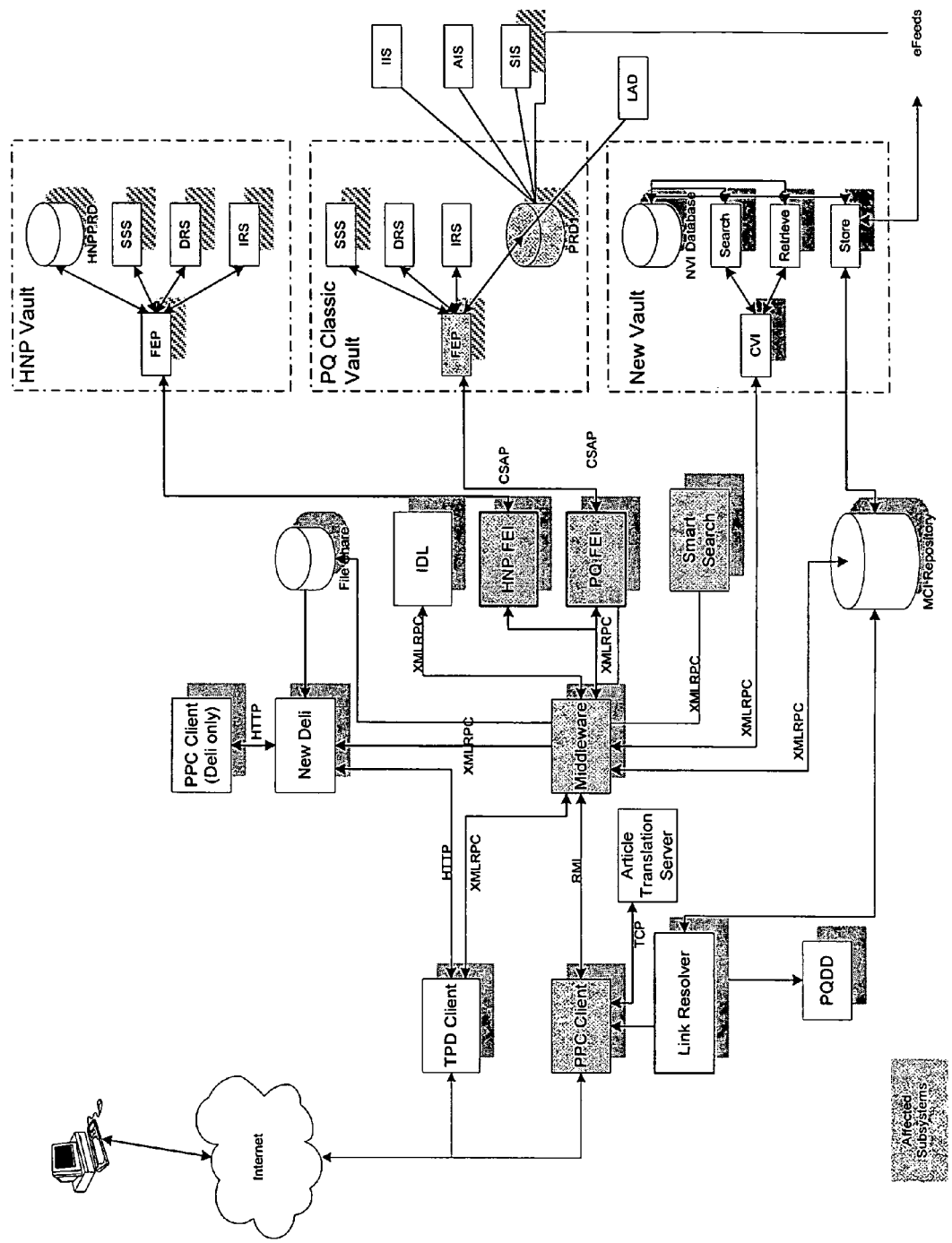
FIG. 23 is a diagram of the hardware layout of a preferred embodiment of the present disclosure.

FIG. 23 is a diagram of the hardware layout of a preferred embodiment of the present disclosure, providing a high level overview of the components of the system. As should be understood by one of ordinary skill in the art, the system is comprised of one or more processors, servers and databases, as well as suitable software for running the system. In the preferred embodiment, the steps performed by the "Smart" Search engine (query catching/metadata exploration) and the steps performed by the "conventional" search engines (from PQ FEI back to FEP, etc.) happens in parallel (called by the middleware), allowing the system to return to the user in a shorter timeframe.

It is to be understood that the embodiment(s) herein described is/are merely illustrative of the principles of the present invention. Various modifications may be made by those skilled in the art without departing from the spirit or scope of the claims which follow.

For example, any and all necessary hardware and software, in any suitable configuration, necessary to run the disclosed method and system is contemplated. Additionally, it should be understood that the query catching and metadata exploration features of the disclosed method and system are applicable to all types of searches of all types of databases or collections of information, and could be expanded to include other context specific topics, index terms, publications, and/or dates including years, months, dates, times, or ranges of the same, or a combination of one or more of the above.

What is claimed is:

1. A method executed via computer hardware and software for searching a database of publications, comprising the steps of:
providing a plurality of navigation features from which a search query can originate and be analyzed, including a first navigation feature, a second navigation feature and a third navigation feature;
selectively providing a search result responsive to the search query for each of the plurality of navigation features, including a first search result comprising query catching terms for the first navigation feature, a second search result comprising metadata exploration terms for the second navigation feature and a third search result for the third navigation feature, wherein the first search result, the second search result and the third search result differ;
selectively providing a plurality of search result options for the first search result, including a first query catching terms search result option, a second query catching terms search result option, a third query catching terms search result option and a fourth query catching terms search result option, wherein selection of the first query catching terms search result option returns an additional search result with query catching terms, wherein selection of the second query catching terms search result option returns an additional search result with metadata exploration terms, wherein selection of the third query catching terms search result option returns a first view select publication result, and wherein selection of the fourth query catching terms search result option returns a browse suggested publications feature result, wherein the additional search result with query catching terms, the additional search result with metadata exploration terms, the first view select publication result and the browse suggested publication feature result differ;

selectively providing a plurality of search result options for the second search result, including a first metadata exploration terms search result option, a second metadata exploration terms search result option and a third metadata exploration terms search result option, wherein selection of the first metadata exploration terms search result option returns a subsequent search result with metadata exploration terms, wherein selection of the second metadata exploration terms search result option returns a subsequent search result with query catching terms, and wherein selection of the third metadata exploration terms search result option returns a second view select publication result, wherein the subsequent search result with metadata exploration terms, the subsequent search result with query catching terms and the second view select publication result differ;

selectively providing a select article search result option for the third search result, wherein selection of the select article search result option returns a third view select publication result; and selectively providing a further search feature for the first, second or third view select publication result, wherein selection of the further search feature returns another subsequent search result with query catching terms; and narrowing or focusing a search of the database of publications by providing for a plurality of further type of search results from the first search result comprising query catching terms, a plurality of further type of search results from the second search result comprising metadata exploration terms and at least one further type of search results from the third search result;

wherein the plurality of further type of search results from the first search result comprising query catching terms includes further results with query catching terms, further results with metadata exploration terms, further results for viewing a selected article and further results for browsing a suggested publication;

wherein the plurality of further type of search results from the second search result comprising metadata exploration terms includes other results with query catching terms, other results with metadata exploration terms, and other results for viewing a selected article;

wherein the at least one further type of search results from the third search result includes more results for viewing a selected article and results for browsing a suggested publication.

2. The method of claim 1, wherein the first query catching terms search result option includes at least one of a search box, a publication type tab, and a limit to full text feature, and wherein the method further comprises the step of returning the additional search result with query catching terms upon selection of at least one of the search box, the publication type tab, and the limit to full text feature.

3. The method of claim 1, wherein the first metadata exploration terms search result option includes at least one of a narrow by topic feature, a narrow by date feature, a narrow by publication feature, a limit to full text feature, and a publication type tab, and wherein the method further comprises the step of returning the subsequent search result with metadata exploration terms upon selection of at least one of the narrow by topic feature, the narrow by date feature, the narrow by publication feature, the limit to full text feature, and the publication type tab.

4. The method of claim 1, wherein the further search feature includes a more-like-this or sideways search feature, and wherein the method further comprises the step of returning a subsequent search result with query catching terms upon selection of the more-like-this feature or the sideways search feature.

5. The method of claim 1, further comprising the step of further narrowing or focusing the search of the database of publications by selectively providing for further search results with query catching terms from the results for viewing a selected article.

6. A method executed via computer hardware and software for searching a database of publications, comprising the steps of:

providing a first navigation feature from which a search query can originate and be analyzed;

selectively providing a first query catching search results page responsive to the search query for the first navigation feature, the first query catching search results page including results with query catching terms;

providing a second navigation feature from which a search query can originate and be analyzed;

selectively providing a first metadata exploration search results page responsive to the search query for the second navigation feature, the first metadata search results page including results with metadata exploration terms;

providing a third navigation feature from which a search query can originate and be analyzed;

selectively providing a basic search results page responsive to the search query for the third navigation feature;

selectively guiding a search of the database of publications by providing for a plurality of further type of search results accessible from the first query catching search results page, wherein the plurality of further type of search results accessible from the first query catching search results page including focused results with query catching terms on a second query catching search results page, focused results with metadata exploration terms on a second metadata exploration search results page, focused results for viewing a selected article on a first view article page, and focused results for browsing a suggested publication on a publication search page;

selectively guiding a search of the database of publications by providing for a plurality of further type of search results accessible from the first metadata exploration search results page, wherein the plurality of further type of search results from the metadata exploration search results page including focused results with query catching terms on a third query catching search results page, focused results with metadata exploration terms on a third metadata exploration search results page, and focused results for viewing a selected article on a second view article page;

selectively guiding a search of the database of publications by providing for at least one further type of search results accessible from the basic search results page, wherein the at least one further type of search results from the basic search results page including focused results for viewing a selected article on a third view article page; and selectively guiding a search of the database of publications by providing for at least one further type of search results accessible from one of the first, second and third view article pages, wherein the at least one further type of search results accessible from one of the first, second and third view article pages including additional focused results with query catching terms on a fourth query catching search results page; and continually narrowing or focusing a search of the database of publications by providing differing search results through navigation between additional query catching search results pages and additional metadata exploration search results pages.

7. The method of claim 6, wherein each continually narrowed or focused search originating from an additional query catching search results page selectively provides one of focused results with query catching terms on a subsequent query catching search results page, focused results with metadata exploration terms oil a subsequent metadata exploration search results page, focused results for viewing a selected article on a subsequent view article page, and focused results for browsing a suggested publication on a subsequent publication search page.

8. The method of claim 6, wherein each continually narrowed or focused search originating from an additional metadata exploration search results page selectively provides one of focused results with query catching terms on a subsequent query catching search results page, focused results with metadata exploration terms on a subsequent metadata exploration search results page, and focused results for viewing a selected article on a subsequent view article page.

\* \* \* \* \*